(12) United States Patent
Miller

(10) Patent No.: US 10,060,490 B2
(45) Date of Patent: Aug. 28, 2018

(54) LINING WEAR ADJUSTMENT DEVICE FOR A DISC BRAKE

(71) Applicant: KNORR-BREMSE Systeme fuer Nutzfahrzeuge GmbH, Munich (DE)

(72) Inventor: Bernhard Miller, Weil der Stadt (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 533 days.

(21) Appl. No.: 14/455,450

(22) Filed: Aug. 8, 2014

(65) Prior Publication Data

US 2014/0345985 A1 Nov. 27, 2014

Related U.S. Application Data

(63) Continuation of application No. PCT/EP2013/052277, filed on Feb. 6, 2013.

(30) Foreign Application Priority Data

Feb. 10, 2012 (DE) .................... 10 2012 002 731

(51) Int. Cl.
*F16D 51/00* (2006.01)
*F16D 65/64* (2006.01)
(Continued)

(52) U.S. Cl.
CPC ........... *F16D 65/64* (2013.01); *F16D 27/004* (2013.01); *F16D 27/02* (2013.01); *F16D 27/06* (2013.01);
(Continued)

(58) Field of Classification Search
CPC ............ F16D 65/567; F16D 2065/386; F16D 2027/001; F16D 2129/08; F16D 2300/18;
(Continued)

(56) References Cited

U.S. PATENT DOCUMENTS 2,692,035 A * 10/1954 Rabinow ................. F16D 27/08
188/79.62
3,848,704 A * 11/1974 Falk ........................ F16D 65/18
188/106 F (Continued)

FOREIGN PATENT DOCUMENTS

CN 1262725 A 8/2000
CN 201121672 Y 9/2008
(Continued)

OTHER PUBLICATIONS

Chinese Office Action issued in counterpart Chinese Application No. 201380015154.1 dated Dec. 29, 2015, with English translation (eleven (11) pages).

(Continued)

*Primary Examiner* — Anna M Momper
*Assistant Examiner* — Mahbubur Rashid
(74) *Attorney, Agent, or Firm* — Crowell & Moring LLP

(57) ABSTRACT

A lining wear adjustment device for a disc brake with a brake application device having a brake actuating lever, which can preferably be inserted into an adjustment spindle of the disc brake, includes an adjusting shaft with an external bearing, a rotary drive element and a clutch device for switchable coupling of the rotary drive element to the adjusting shaft. The clutch device is an electrically controllable solenoid clutch with at least one electromagnetic coil.

35 Claims, 16 Drawing Sheets

(51) Int. Cl.
*F16D 27/02* (2006.01)
*F16D 27/14* (2006.01)
*F16D 65/56* (2006.01)
*F16D 27/00* (2006.01)
*F16D 27/06* (2006.01)
*F16D 125/28* (2012.01)
*F16D 129/08* (2012.01)
*F16D 65/38* (2006.01)

(52) U.S. Cl.
CPC ........... *F16D 27/14* (2013.01); *F16D 65/567* (2013.01); *F16D 2027/001* (2013.01); *F16D 2065/386* (2013.01); *F16D 2125/28* (2013.01); *F16D 2129/08* (2013.01); *F16D 2300/18* (2013.01)

(58) Field of Classification Search
CPC ........ F16D 27/004; F16D 27/02; F16D 27/14; F16D 65/64
USPC ...................................................... 188/79.55
See application file for complete search history.

(56) References Cited

U.S. PATENT DOCUMENTS

| | | | | |
|---|---|---|---|---|
| 4,235,311 A | * | 11/1980 | Brinkmann | F16D 55/00 188/161 |
| 4,270,642 A | * | 6/1981 | Densow | F16D 27/02 192/107 T |
| 4,718,529 A | * | 1/1988 | Kroeger | F16D 27/112 192/107 M |
| 4,935,713 A | * | 6/1990 | Bekheet | F16D 27/112 192/84.961 |
| 4,966,255 A | * | 10/1990 | Fossum | F16D 59/02 188/171 |
| 5,009,292 A | * | 4/1991 | Hoffman, Jr. | F16D 65/18 188/196 M |
| 6,206,149 B1 | * | 3/2001 | Heidenreich | F16D 55/2245 188/1.11 W |
| 6,250,434 B1 | * | 6/2001 | Baumgartner | F16D 65/568 188/196 R |
| 6,250,436 B1 | * | 6/2001 | Oikawa | B60T 1/065 188/1.11 E |
| 6,311,807 B1 | | 11/2001 | Rinsma | |
| 7,497,306 B2 | | 3/2009 | Severinsson | |
| 7,610,998 B2 | | 11/2009 | Baumgartner et al. | |
| 9,188,183 B2 | * | 11/2015 | Yasui | F16D 65/18 |
| 9,803,711 B2 | * | 10/2017 | Sandberg | F16D 65/567 |
| 2005/0241894 A1 | | 11/2005 | Baumgartner et al. | |
| 2006/0151262 A1 | | 7/2006 | Baumgartner et al. | |
| 2006/0163939 A1 | * | 7/2006 | Kuramochi | B60T 8/885 303/122.04 |
| 2006/0219486 A1 | | 10/2006 | Wagner et al. | |
| 2007/0256901 A1 | * | 11/2007 | Niehorster | F16D 65/54 188/71.7 |
| 2009/0057074 A1 | * | 3/2009 | Tsuruta | F16D 65/14 188/71.8 |
| 2013/0008749 A1 | * | 1/2013 | Sandberg | F16D 55/227 188/71.8 |
| 2013/0025983 A1 | * | 1/2013 | Wolf | F16D 65/14 188/72.4 |

FOREIGN PATENT DOCUMENTS

| | | |
|---|---|---|
| DE | 10 2008 017 225 A1 | 10/2009 |
| DE | 102012012818 A1 * | 1/2014 ............ F16D 65/18 |
| EP | 1 476 673 B1 | 9/2005 |
| EP | 1 107 007 B1 | 11/2005 |
| WO | WO 95/09991 A1 | 4/1995 |
| WO | WO 00/76819 A1 | 12/2000 |
| WO | WO 2005/042323 A1 | 5/2005 |

OTHER PUBLICATIONS

International Search Report (PCT/ISA/210) dated Sep. 3, 2013, with English translation (Five (5) pages).
German Office Action dated Aug. 11, 2014 (Seven (7) pages).
International Preliminary Report on Patentability (PCT/IB/373) dated Aug. 12, 2014, including English language translation of Written Opinion (PCT/ISA/237) (Five (5) pages).

* cited by examiner

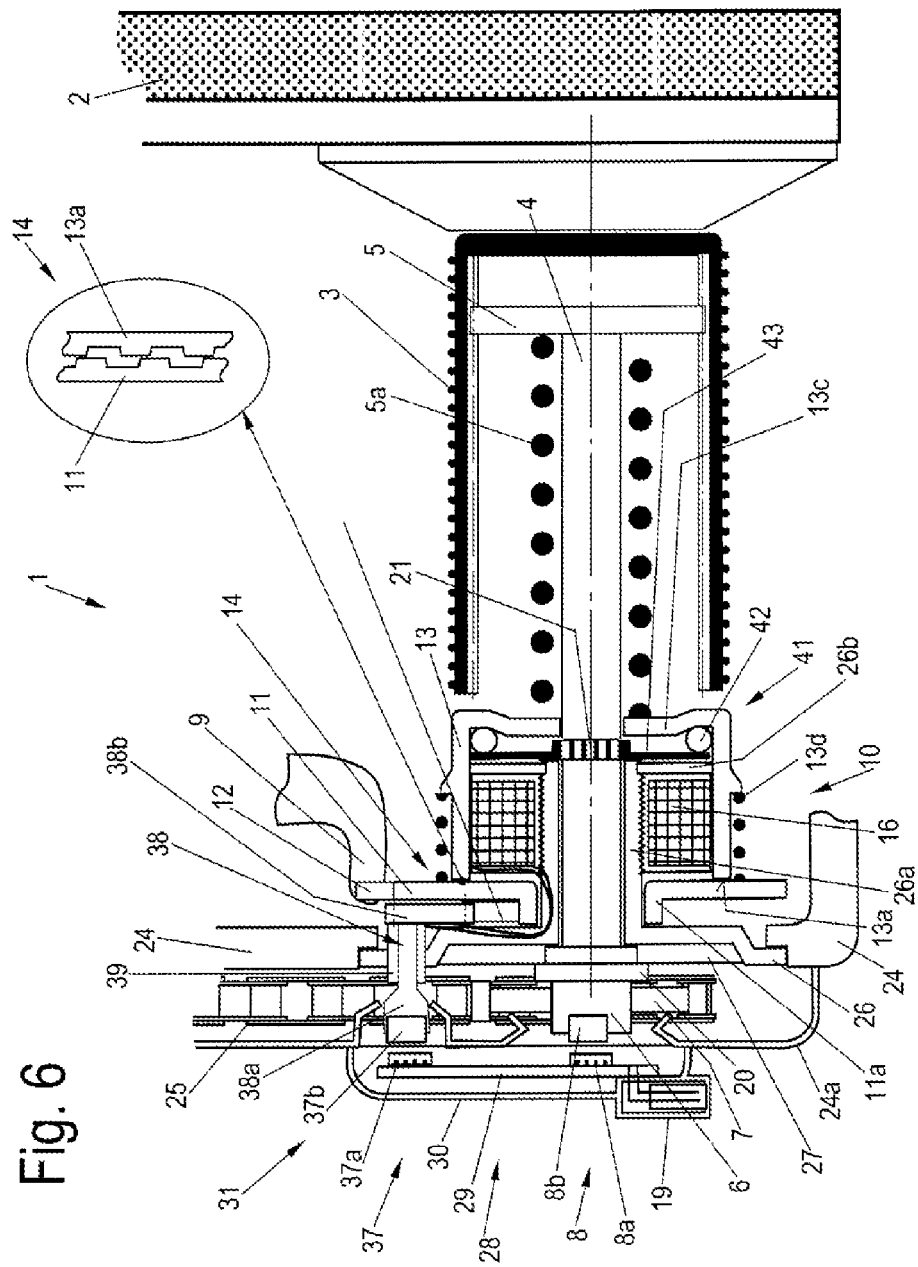

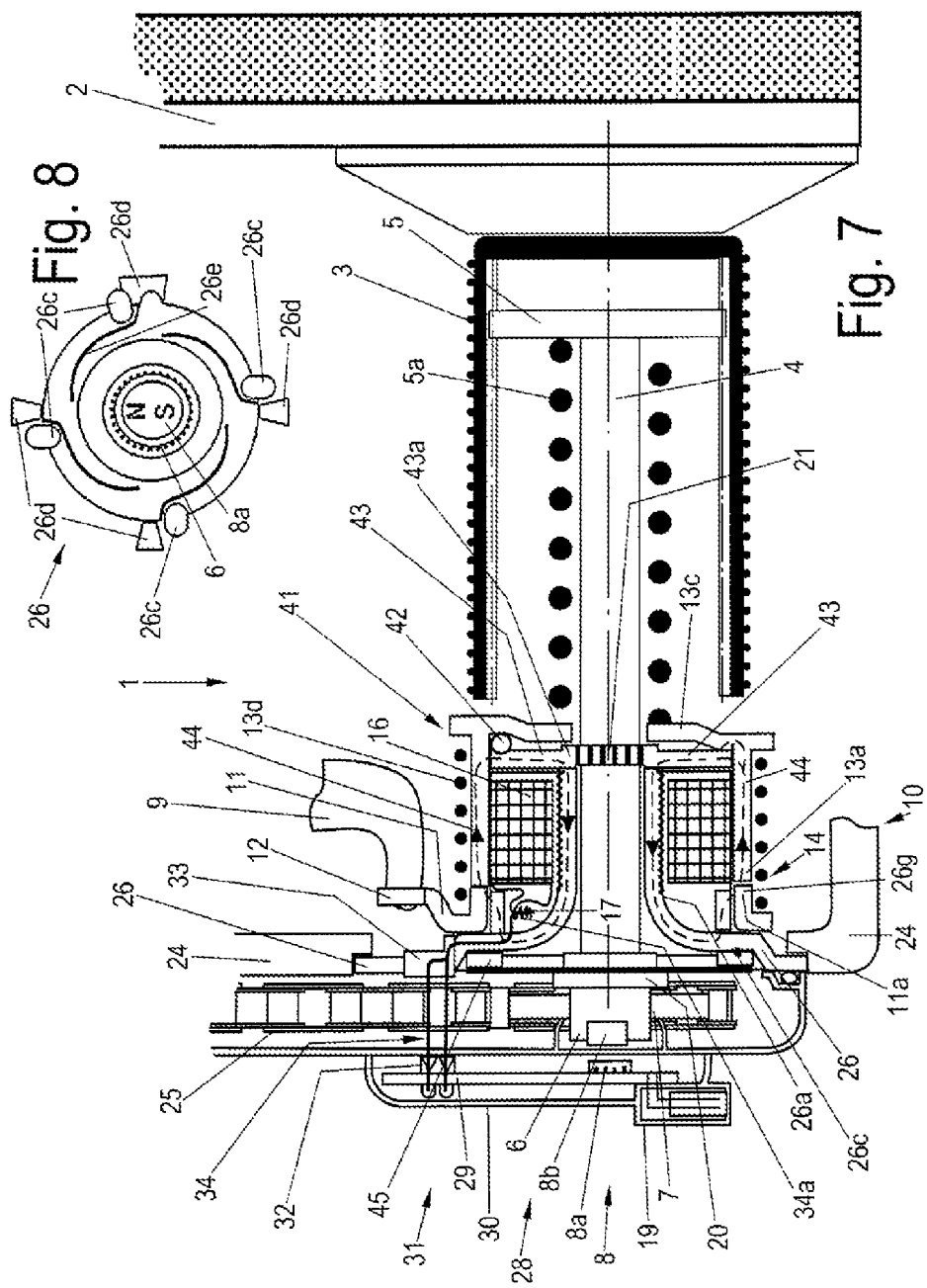

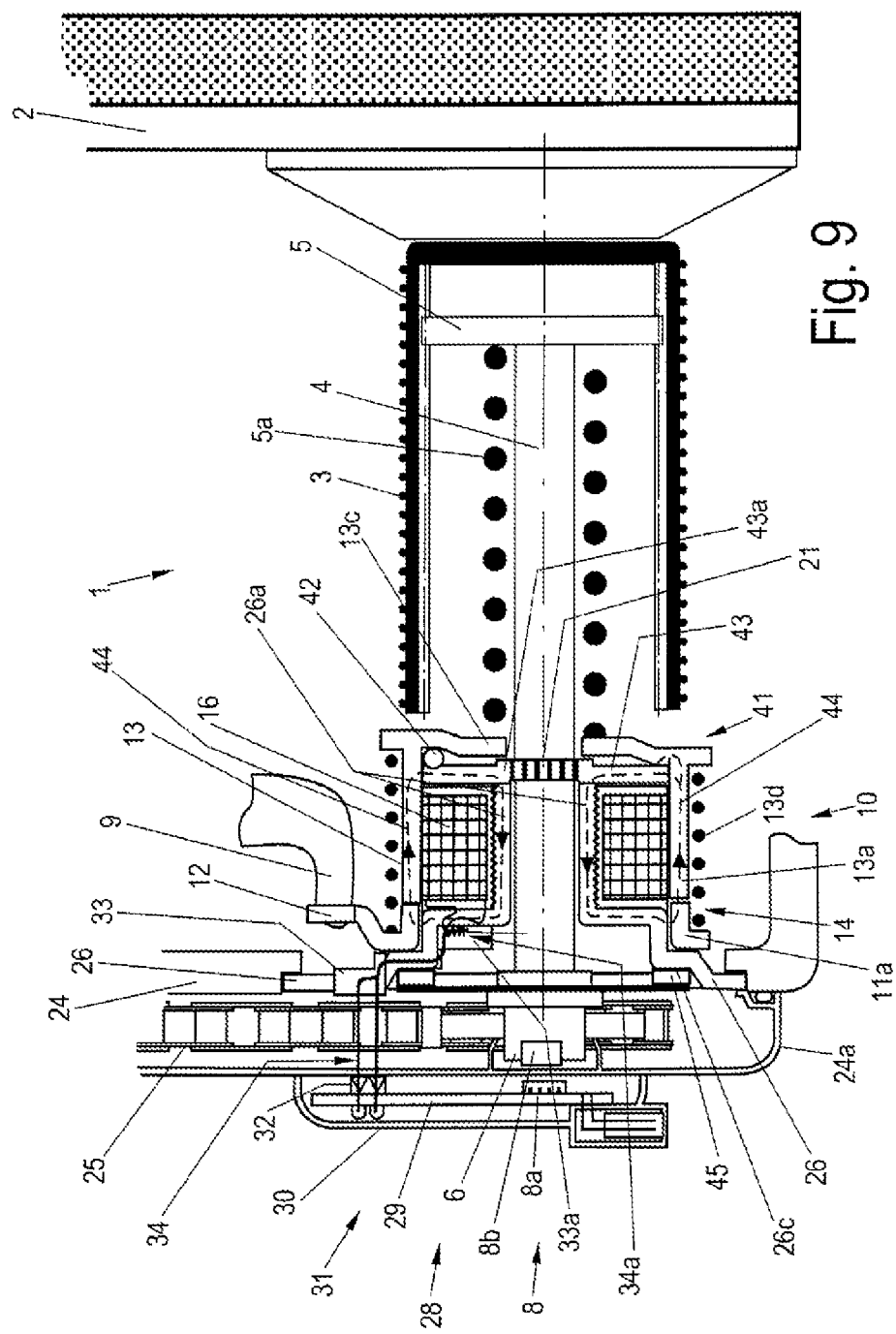

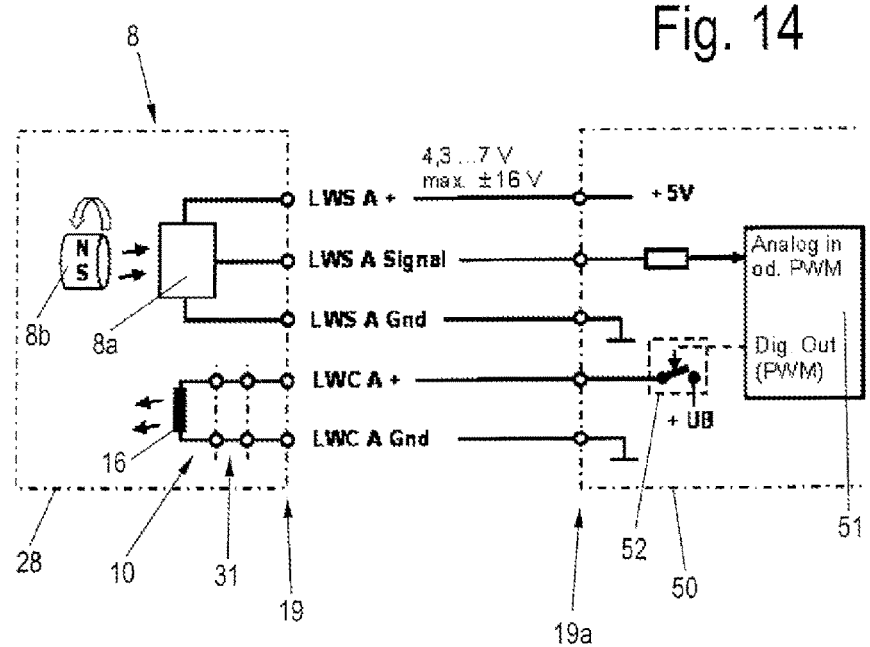
Fig. 14
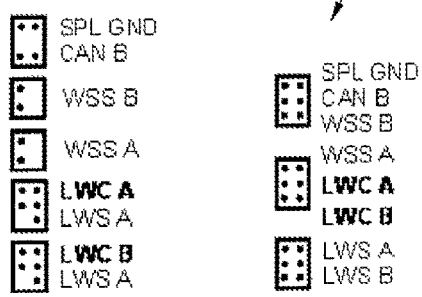
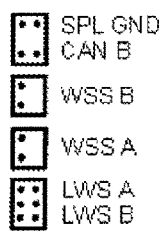
Fig. 15   Fig. 16   Fig. 17

LINING WEAR ADJUSTMENT DEVICE FOR A DISC BRAKE

CROSS REFERENCE TO RELATED APPLICATIONS

This application is a continuation of PCT International Application No. PCT/EP2013/052277, filed Feb. 6, 2013, which claims priority under 35 U.S.C. § 119 from German Patent Application No. 10 2012 002 731.1, filed Feb. 10, 2012, the entire disclosures of which are herein expressly incorporated by reference.

BACKGROUND AND SUMMARY OF THE INVENTION

The invention relates to a lining (brake pad) wear adjustment device for a disc brake, in particular for a motor vehicle, having a brake application device with a brake actuating lever. The wear adjustment device can preferably be inserted into an adjustment spindle of the disc brake. The invention also relates to a method for controlling the lining wear adjustment device and to a corresponding disc brake.

Lining wear adjustment devices of this type are known in different embodiments such as, for example, mechanical adjusters with automatic adjustment of a friction point. In this context, every time the brakes are actuated, the wear adjustment device is activated, for example by an actuating lever of a brake application device of the disc brake. In the case of wear on brake linings (brake pads) and the brake disc, automatic adjustment of the linings occurs by means of the adjustment device, for example by means of an adjustment movement of longitudinally variable thrust spindles.

EP 1 476 673 B1 describes a disc brake with an adjustment device which is driven by an electric motor and a method for controlling a disc brake.

These known arrangements have proven effective.

The object of the present invention is to provide an improved lining wear adjustment device for a disc brake. A further object is to provide an improved disc brake.

This and other objects are achieved by a lining wear adjustment device having a brake application device with a brake actuating lever. The wear adjustment device can preferably be inserted into an adjustment spindle of the disc brake. The wear adjustment device includes an adjustment shaft having an external bearing, a rotary drive element, and a clutch device for controllably coupling the rotary drive element to the adjustment shaft, wherein the clutch device is configured to be an electrically controllable solenoid clutch having at least one electromagnetic coil.

The lining wear adjustment device has the clutch device configured so as to be electrically controllable with the at least one electromagnetic coil. An existing brake actuating lever is used to provide a drive. The transmission of the torque, brought about by this brake actuating lever, to an adjustment spindle can be controlled easily by a switch by way of the controllable clutch device.

The brake lining/linings can be adjusted as an actuation process on the basis of wear but also as a resetting process. It is therefore possible to set a so-called clearance between the brake lining and the brake disc. Resetting is possible if the clutch device is switched on during a return movement of the brake actuating lever.

A lining wear adjustment device according to the invention for a disc brake, in particular for a motor vehicle, having a brake application device with a brake actuating lever, can preferably be inserted into an adjustment spindle of the disc brake. The wear adjustment device includes an adjustment shaft having an external bearing, a rotary drive element, and a clutch device for controllably coupling the rotary drive element to the adjustment shaft. The clutch device is designed as a solenoid clutch which is electrically controllable with at least one electromagnetic coil.

A method is provided according to the invention for controlling the lining wear adjustment device of a disc brake, in particular for a motor vehicle, having a brake application device with a brake actuating lever and at least one adjustment spindle. When lining wear is detected, adjustment takes place after a presettable comparison value has been reached by energization of the electromagnetic coil of the clutch device during adjustment of the brakes by the brake actuating lever.

According to one embodiment, the clutch device includes at least one section of the rotary drive element and/or a section which is connected in a rotationally fixed fashion to the rotary drive element, a clutch cover, the at least one electromagnetic coil and a coil carrier. As a result, a compact design becomes possible.

There is provision that the rotary drive element is arranged on an input side of the clutch device so as to be pivotable about a common axis of the adjustment spindle and of the clutch device and to be axially displaceable. Alternatively, the section which is connected in a rotationally fixed fashion to the rotary drive element can be axially displaceable, wherein the rotary drive element then just carries out a pivoting movement.

In this way, the rotary drive element can be pivoted by the brake actuating lever without actuation taking place. The torque is transmitted to the adjustment spindle only if the clutch device is switched on, wherein the rotary drive element is displaced axially into the engagement position of the clutch device when the clutch occurs.

According to one embodiment, the coil carrier is connected in a rotationally fixed fashion to the rotary drive element. A compact design is therefore possible, wherein the electromagnetic coil can be pivoted with the rotary drive element.

According to an alternative embodiment, the coil carrier is fixedly connected to the external bearing of the adjustment shaft. The electromagnetic coil does not pivot during an adjustment process. Through a suitable selection of materials for the coil carrier, the magnetic force lines of the electromagnetic coil can be advantageously influenced in the switched-on state, in order to keep a leakage field as small as possible and bring about a strong clutch force.

According to a further alternative embodiment, the coil carrier has a disc section with a shell receptacle which is spherical in the central region. The spherical shell receptacle receives a spherical projection of a disc of the external bearing of the adjustment shaft and corresponds to the spherical projection of the disc of the external bearing. It is then advantageously possible for an angular movement of the lining wear adjustment device to be compensated during actuation.

According to a further embodiment, the clutch cover surrounds the electromagnetic coil in a pot shape, is connected in a rotationally fixed fashion to the adjustment shaft and has a clutch region which forms a clutch section with a section of the rotary drive element or with a section which is connected in a rotationally fixed fashion to the rotary drive element. A compact design of the entire lining wear adjustment device can be made possible by drawing in sections of the rotary drive element.

According to one embodiment, the clutch section is embodied with friction linings. They can be designed, for example, as a coating or provided as additional parts.

According to an alternative embodiment, the clutch section is design as a toothed clutch. The clutch section, which is designed as the toothed clutch, can have an oblique angle, wherein this angle can be, for example, in the range of 20°. The clutch forces can therefore be kept small in the coupled state, wherein the electromagnetic coil takes up a correspondingly small amount of space.

According to a further embodiment, the clutch device is provided with at least one release or resetting spring. An uncoupled or released state of the clutch device is therefore ensured even in difficult environmental conditions, for example temperature differences and/or vibration.

To compensate for angular movements of the adjuster, according to one alternative embodiment the external bearing can be designed with a cardanic bearing of the adjustment shaft.

The lining wear adjustment device has a connection device which is connected in an electrically conductive fashion to the at least one electromagnetic coil. The electromagnetic coil is connected electrically by use of a plug-type connection. This makes it possible to change the connection device easily and quickly in the case of maintenance or replacement without, in particular, electrical connections having to be released or produced by use of tools.

According to another embodiment, the plug-type connection has conductors which are guided through the external bearing by use of an elastic securing device and are secured in the external bearing. As a result, stresses and movements during the actuation of the lining wear adjustment device can be compensated. The electromagnetic coil is connected to the conductors.

According to a further embodiment, the lining wear adjustment device has at least one lining wear sensor. It is therefore possible to carry out an adjustment process in a targeted fashion as a function of the wear of brake linings and the brake disc by virtue of the fact that the clutch device is correspondingly switched on and off According to another embodiment, the at least one lining wear sensor is at least partially a component of the connection device. A particularly compact and simple design is therefore possible.

It is particularly advantageous if the at least one lining wear sensor is embodied as an angle sensor, wherein a wear sensor element is arranged in the connection device and interacts with a wear encoder element which is connected to the adjustment shaft. In this context, the wear sensor element can be, for example, a Hall sensor, wherein the wear encoder element can be a permanent magnet. It is advantageous here that an effect of the permanent magnet on the sensor element occurs via a wireless magnetic field. Therefore, for example, separate mounting of the wear sensor element in the connection device and wear encoder element on the adjustment shaft is possible, which facilitates replacement and maintenance work and, in particular, adjustment work.

According to yet a further embodiment, the lining wear adjustment device has at least one actuating lever sensor. The adjustment lever sensor can be designed as at least partially a component of the connection device and also as an angle sensor. In this context, as in the case of the lining wear sensor, an adjusting sensor element can be arranged in the connection device and can interact with an actuating encoder element which is coupled to the brake actuating lever.

As in the case of the lining wear sensor, it is also highly advantageous here if the actuating encoder element is a permanent magnet. The number of spare parts is reduced through the selection of identical sensor elements and encoder elements. Furthermore, identical components and evaluation programs are used to evaluate and connect the sensor elements.

According to a further embodiment, the connection device can have a control unit. Retrofitting of existing disc brakes is therefore possible since, for example, previous electromechanical potentiometers can be modeled electronically, wherein existing connections of a potentiometer on a control unit can continue to be used by the modeled connections, for example by use of the control unit.

According to yet a further embodiment, the clutch device has at least one anti-rotation device. This can be achieved, for example, by way of separate friction faces on the components of the clutch device and external bearing together with force accumulator elements, for example pressure/tension springs. A reliable securing force and robust design are therefore obtained.

According to a further embodiment of the method, the electromagnetic coil is energized as a function of a detected movement of the brake adjustment lever. This is possible if a combination of a lining wear sensor and actuating lever sensor is present in the lining wear adjustment device.

According to yet a further embodiment, a friction point can be detected by the frictional engagement of the adjustment spindle in that the actuating movement of the brake actuating lever and an adjustment movement of the lining wear adjustment device are detected. If an adjustment movement occurs at the same time as an actuating movement of the brake actuating lever and is then no longer present despite a further actuating movement, the friction point is reached. This may also be the case if no adjustment movement occurs at the start of an actuating movement.

According to yet a further embodiment, the lining wear adjustment device is reset by a presettable value by a return movement of the brake actuating lever by energizing the electromagnetic coil when the brake lining bears against the brake disc without brake application tension and grinds. Such bearing and grinding can be detected, for example, by a temperature sensor.

It is also possible to reset the brake lining/linings into its/their home position by return movements of the brake actuating lever with simultaneous switching on of the clutch device, which is necessary for example, for replacement and maintenance.

A disc brake having a brake application device with a brake actuating lever and at least one adjustment spindle has at least one lining wear adjustment device as described above.

By way of the lining wear adjustment device, not only lining wear adjustment but also lining resetting, for example in the case of a fault or in the case of replacement and maintenance, are possible, using the clutch device with the electromagnetic coil, in other words with an electromagnetic clutch. In this case, so-called clearance setting is also easily possible. The drive source here is the brake actuating lever as before in the case of mechanical adjustment devices.

Furthermore, a so-called stand-alone version is possible which can be retrofit into existing series-mounted brakes.

The lining wear adjustment device has a connection device which, in one version, makes available an analog signal of the lining wear sensor and of the actuating lever sensor (if used). For this purpose, the connection device has a control device, for example a microcomputer or small processor. The connection device can, however, also transmit the sensor signals in a digital fashion without a control device to the superordinate control unit with a corresponding control device.

When a failure of the electrical brake (for example, failure of a 5 V supply voltage of a potentiometer) is detected, the tracking of the brake system can be ensured. This is done by actuating the electromagnetic coil after it has been detected that the clearance has been closed, as long as the brake still actuates, but not when the brake is released.

The stand-alone version is compatible with previous embodiments and can therefore be replaced for the purpose of retrofitting.

The lining wear adjustment device also has the following advantages:
- Autonomous electrical lining detection and adjustment
- Analog outputting of lining wear
- High possible torque for adjusting by use of a toothed clutch
- Reliable securing force by means of one, but preferably two, friction faces (ramp toothing systems are also possible instead of friction faces)
- Simple robust design
- Independent supply voltage
- Lining wear adjustment even in emergency operating mode of the brake (back-up).

The lining wear adjustment device can additionally have an overload clutch, for example a ball ramp clutch or oblique toothing system.

The electromagnetic coil can also be energized by way of PWM or some other suitable actuation processes. It is therefore possible, for example, to obtain a settable overload clutch.

The electromagnetic coil is provided with connection wires of a line which is connected to a plug-type connection. In this context, the connection wires can be stranded conductors or conductor tracks of a flexible circuit board which, through their flexibility, can compensate angular movements when the lining wear adjustment device is actuated.

Furthermore, it may be possible for the connection device to be provided with signal processing for a rotational speed signal of a rotational speed sensor of the associated wheel. In this context, the rotational speed sensor can also be connected to the connection device, wherein its rotational speed signal can be processed in such a way that it can be transmitted in a common cable from the disc brake to the control unit for evaluation.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 6 shows a schematic sectional view of a fourth exemplary embodiment of the lining wear adjustment device according to the invention;

FIG. 7 shows a schematic sectional view of a variant of the fourth exemplary embodiment according to FIG. 6;

FIG. 8 shows a schematic plan view of an external bearing of the fourth exemplary embodiment according to FIG. 6;

FIGS. 9-11 show schematic sectional views of further variants of the fourth exemplary embodiment according to FIG. 6;

FIG. 14 shows a schematic block circuit diagram of the second exemplary embodiment according to FIG. 3;

FIG. 15 shows a schematic illustration of a customary plug assignment;

FIGS. 16-17 shows schematic illustrations of various plug assignments of the second exemplary embodiment according to FIG. 3;

DETAILED DESCRIPTION OF THE DRAWINGS

Figure 1:
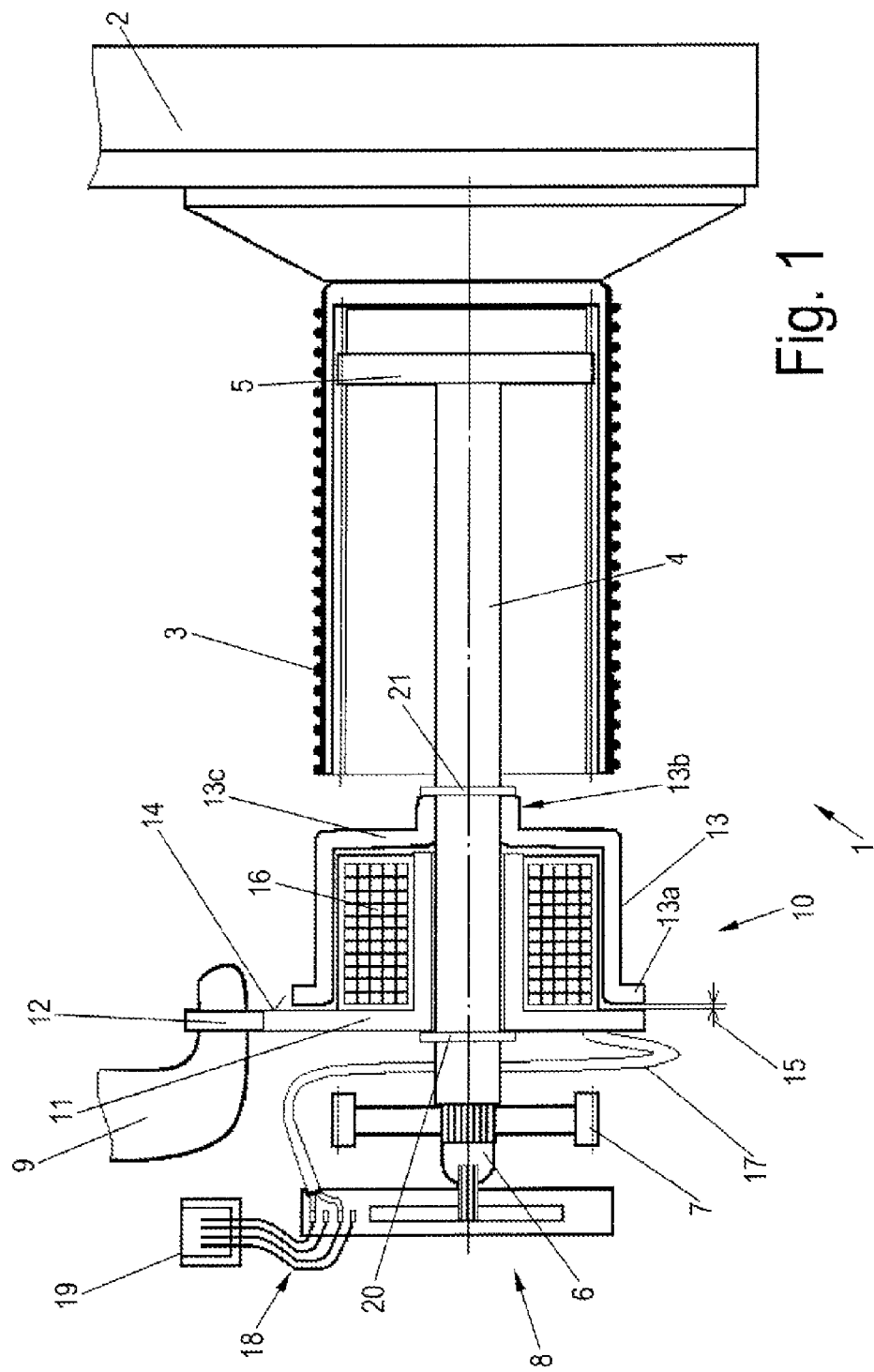
FIGS. 1 and 2 show schematic sectional views of a first exemplary embodiment of a lining wear adjustment device according to the invention for a disc brake in a released (FIG. 1) and activated position (FIG. 2)
Figure 2:
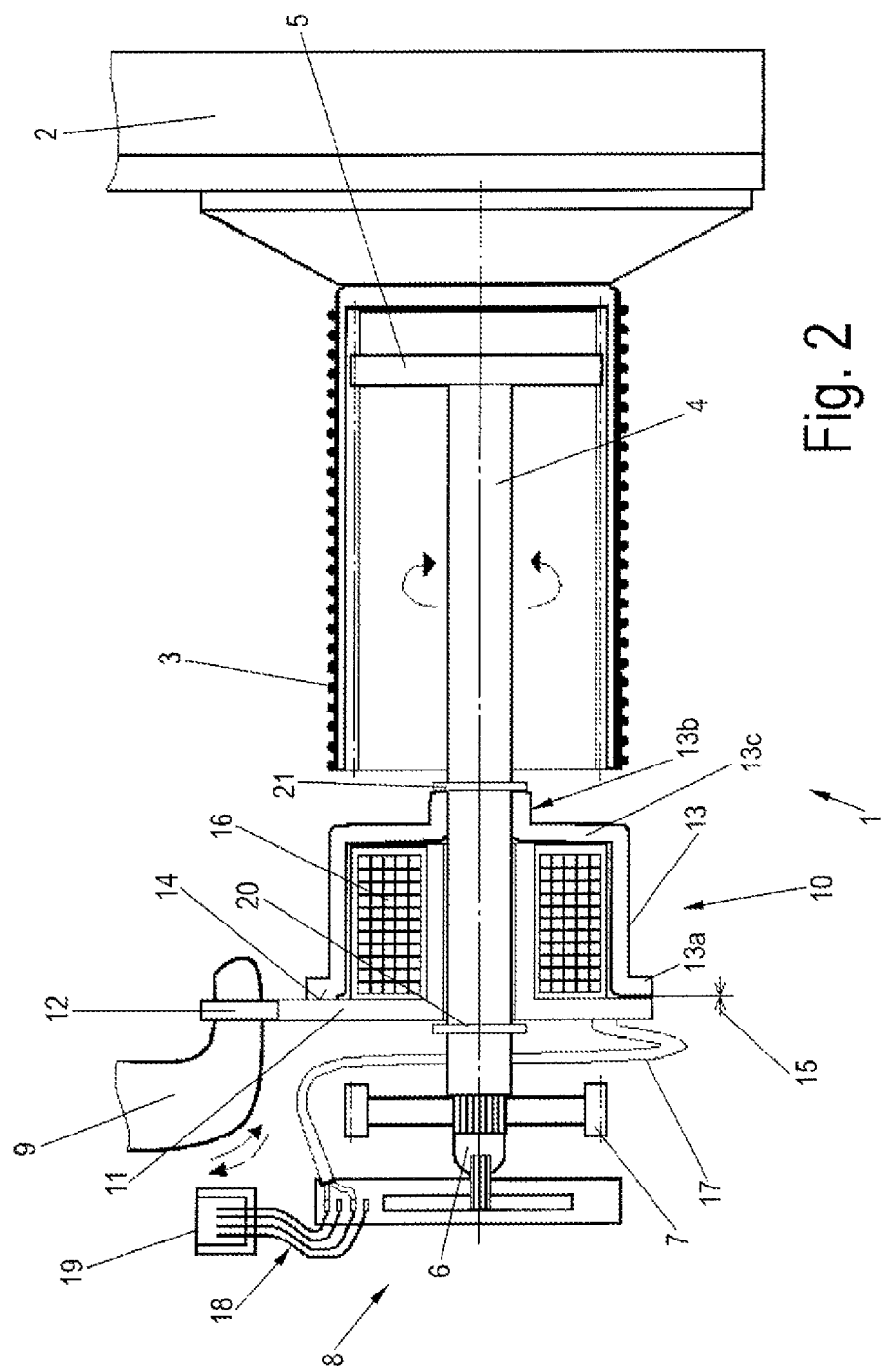

FIG. 1 is a schematic sectional view of a first exemplary embodiment of a lining wear adjustment device 1 according to the invention for a disc brake in a released position. FIG. 2 shows the first exemplary embodiment in an activated position.

A disc brake is shown here from its brake application side and has a brake caliper (not illustrated) which engages over a brake disc (also not illustrated here). Brake linings (also called "brake pads") 2 are arranged on each side of the brake disc. Only the brake-application-side brake lining 2 is depicted and has an adjustment spindle 3 connected thereto. The other brake lining on the opposite side of the brake disc is mounted in the brake caliper. The brake caliper can be, for example, a sliding caliper. A brake actuating lever 9 for brake application of the disc brake is shown. The adjustment spindle 3 is provided with an external thread and is screwed into a pressure ram (also called a bridge) (not shown) which interacts with the brake actuating lever. The disc brake can have more than one pressure ram with respect to the adjustment spindle 3.

The adjustment spindle 3 is also provided with an internal thread which is in engagement with an output wheel 5 of an adjustment shaft 4. The output wheel 5 is attached in a rotationally fixed fashion to one end of the adjustment shaft 4, which end points toward the brake lining 2.

The other end of the adjustment shaft 4 is provided, in this first exemplary embodiment, as a transmission end 6 with a transmission wheel 7 and is coupled to a lining wear sensor 8. The transmission wheel 7 is designed, for example, as a chain gearwheel and is coupled via a chain 25 (see FIG. 3) to a further adjustment spindle (not shown). The lining wear sensor 8 in this embodiment has, for example, a potentiometer with or without a transmission. The potentiometer can also be a multi-turn potentiometer and is connected electrically to a connecting element 19 via a connecting line 18. The connecting element 19 serves to electrically connect to a brake control unit or some other control unit and can be configured, for example, as a multi-pole, for example five pole, angular plug. An electrical resistance of the multi-turn potentiometer can be changed by a rotational angle of the coupled adjustment shaft 4, and is proportional to the lining wear of the brake lining 2 or brake linings of the disc brake.

The adjustment shaft 4 is coupled to a clutch device 10, in a section which adjoins the transmission end 6. The clutch device 10 is designed as a solenoid (electromagnetic) clutch and has a rotary drive element 11 with a toothed engagement section 12, a clutch cover 13 and an electromagnetic coil 16. The rotary drive element 11 with the toothed engagement section 12 is attached to the input side of the clutch device 10, the teeth 12 interacting with the brake actuating lever 9. The toothed engagement section 12 is integrally formed on a disc of the rotary drive element 11, at a radial distance from the adjustment shaft 4. This disc is connected in a rotationally fixed fashion to a coil carrier 26a (see FIG. 3, for example), which is a tubular section here. The coil carrier 26a supports the annular electromagnetic coil 16 and is axially displaceable on the adjustment shaft 4. The axial displaceability of the rotary drive element 11 and of the coil carrier 26a which is connected thereto in this exemplary embodiment is bounded by axial stops 20, 21 on the adjustment shaft 4. The electromagnetic coil 16 is electrically connected to the connecting line 18, and therefore to the connecting element 19, via a line 17.

The annular electromagnetic coil 16 is surrounded in a hood shape on the coil carrier 26a via the clutch cover 13. The clutch cover 13 is provided on its side pointing toward the disc of the rotary drive element 11 with a flange-like clutch region 13a, and in the released position shown in FIG. 1 it is spaced apart, via a clutch gap 15, from a region corresponding thereto. This clutch region 13a and the region of the rotary drive element 11 corresponding thereto, forms a clutch section 14. The regions of the clutch section 14 can be designed, for example, with special friction layers or friction linings.

The clutch cover 13 extends from the clutch region 13a parallel to the adjustment shaft 4 to the side pointing to the brake lining 2, on which side the clutch cover 13 is closed off with a wall section 13c in a radial direction as far as a central flange-like connecting section 13b. The flange-like connecting section 13b is connected in a rotationally fixed fashion to the adjustment shaft 4 and is additionally axially fixed by way of the axial stop 21.

The movement of the brake actuating lever 9 during the brake application of the disc brake is used to rotate the adjustment spindle 3 in order to adjust the brake lining 2. If an adjustment is to take place, the electromagnetic coil 16 is switched on, i.e. supplied with current via the line 17. Magnetic force lines, which run through the rotary drive element 11, the clutch cover 13 and also partly through the adjustment shaft 4, are produced by the electromagnetic effect which is generated in the process. The axially displaceable rotary drive element 11 is coupled together on the adjustment shaft 4 to the flange-like clutch region 13a of the clutch cover 13 via the associated clutch elements, for example friction faces or friction linings. In this context, the clutch gap 15 closes. This activated position is illustrated in FIG. 2. The electromagnetic coil 16, which is attached to the coil carrier 26a which is fixedly connected to the rotary drive element 11, also rotates with the rotating movement of the rotary drive element 11. The line 17 is embodied here in a flexible fashion, for example as stranded wires or as flexible conductor foil.

During a brake application movement of the brake actuating lever 9, the rotary drive element 11 is then rotated by means of the tooth engagement 12, and a torque is transmitted via the activated clutch device 10 to the clutch cover 13 via the clutch section 14, and thus to the adjustment shaft 4. Through such rotation of the adjustment shaft 4, the adjustment spindle 3 is also rotated by way of the output wheel 5 and brings about, with its external thread in the pressure ram, an axial adjustment of the brake lining 2 toward the brake disc, in order to compensate wear of the brake lining 2. If the brake actuating lever 9 moves back into its home (or rest) position, the electromagnetic coil 16 is previously switched off, that is to say is no longer energized, with the result that the torque is no longer transmitted from the brake actuating lever 9 to the adjustment shaft 4. Movements of the brake actuating lever 9 and of the adjustment shaft 4 are indicated with arrows.

The transmission of the torque of the clutch device 10 is configured such that when the lining wear is not present, that is to say when the brake lining 2 does not have to be adjusted, the clutch device 10 can slip.

Furthermore, instead of an adjustment movement, the clutch device 10 can also be activated only during the return movement of the brake actuating lever 9, as a result of which it is possible to reset the brake lining 2.

The activation of the clutch device 10 can take place on the basis of different criteria such as, for example, after a definable number of brake application processes and measured lining wear by means of the lining wear sensor 8. The clutch device 10 for resetting the brake lining 2 can be activated, for example, in the event of a fault and in order to change the brake lining and by activating the brake actuating lever 9. Furthermore, it is possible to reset the lining wear adjustment device 1 by means of activation of the clutch device 10 if the brake lining 2 bears against the brake disc without brake application tension and grinds. This can be defined in turn by various criteria such as, for example, by temperature sensors at a suitable location in the vicinity of the brake lining 2 or the carrier thereof.

Figure 3:
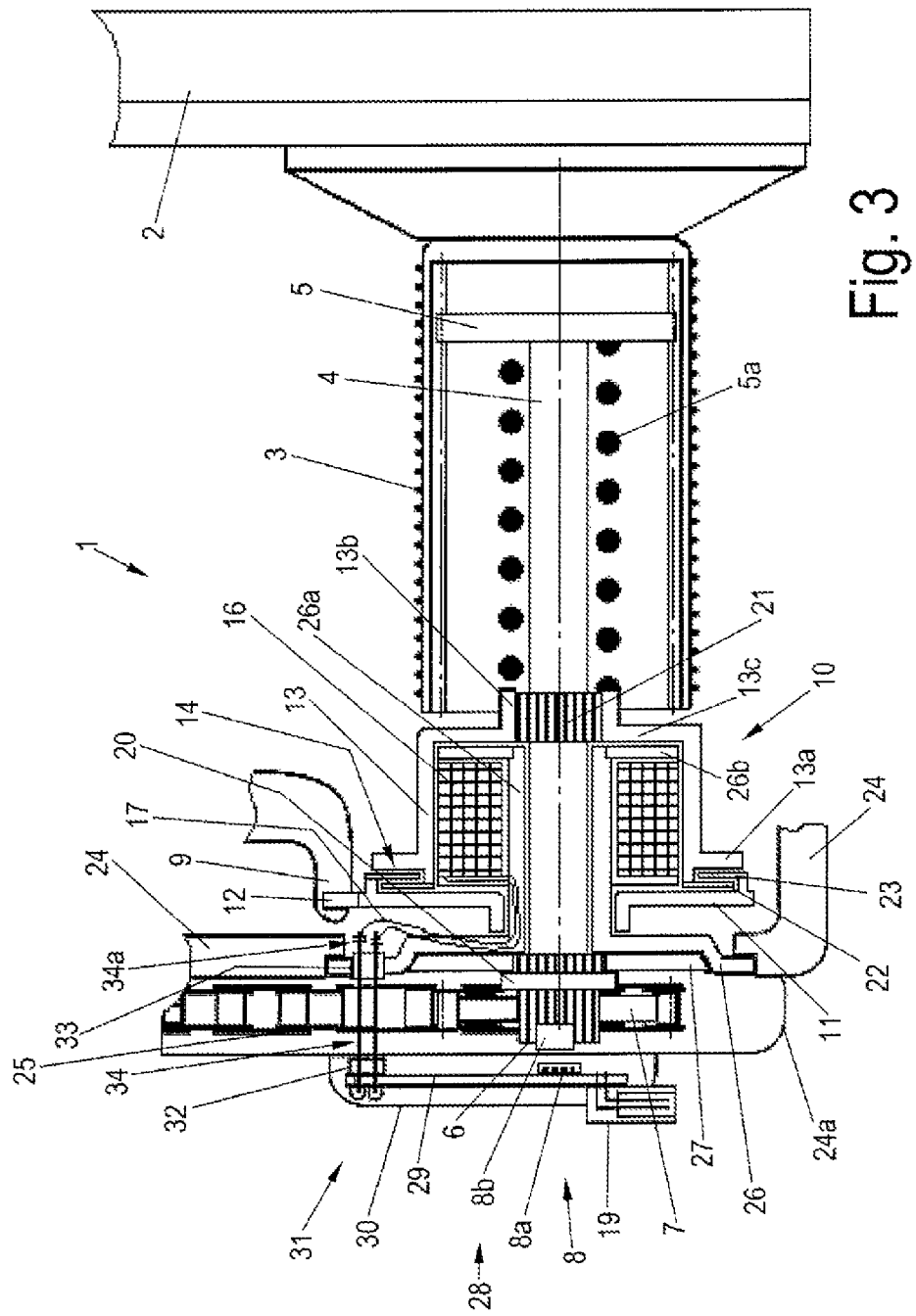
FIG. 3 shows a schematic sectional view of a second exemplary embodiment of the lining wear adjustment device according to the invention.

FIG. 3 shows a schematic sectional view of a second exemplary embodiment of the lining wear adjustment device 1 according to the invention.

The clutch device 10 of the second exemplary embodiment is also designed as an electromagnetic clutch and has the rotary drive element 11 with the tooth engagement section 12, the clutch cover 13 and the electromagnetic coil 16.

In contrast to the first exemplary embodiment, the electromagnetic coil 16 is fixedly attached to the coil carrier 26a. The coil carrier 26a is here a tubular section of a fixed external bearing 26 and when rotating movements of the rotary drive element 11 occur it does not carry out any pivoting movements associated therewith in the activated state. The external bearing 26 is connected in a rotationally fixed fashion to the brake housing 24.

The rotary drive element 11 is attached with the tooth engagement section 12 to the input side of the clutch device 10, wherein the tooth engagement section 12 interact with the brake actuating lever 9. The tooth engagement section 12 is integrally formed onto the disc of the rotary drive element 11 at a radial distance from the adjustment shaft 4. This disc is, however, provided with just a short flange section with a bore through which the coil carrier 26 extends axially. The short flange section of the rotary drive element 11 is therefore arranged in an axially displaceable fashion on the coil carrier 26a of the external bearing 26. The axial displaceability of the rotary drive element 11 is bounded by the disc-shaped configuration of the external bearing toward the transmission end 6 of the adjustment shaft 4 and by the clutch cover 13 toward the brake lining 2. The electromagnetic coil 16 is electrically connected to connecting ends 34a of the conductor elements 34 of a plug-type connection 31 via the line 17. More details on this connection are given below.

The annular electromagnetic coil 16 on the coil carrier 26a of the external bearing 26 is also surrounded in the second exemplary embodiment by the clutch cover 13 in the shape of a hood or pot. The clutch cover 13 is provided at its side pointing to the disc of the rotary drive element 11 with the flange-like clutch region 13a and connected to a friction lining 22 which interacts with a friction lining 23 which is attached to the disc of the rotary drive element 11. Of course, there may also be a plurality of friction linings. These friction linings 22, 23 form the clutch section 14 together with the associated securing means.

In this second exemplary embodiment, the clutch cover 13 also extends from the clutch region 13a parallel to the adjustment shaft 4 to the side pointing to the brake lining 2 and is closed off with the wall section 13c in a radial direction as far as the central flange-like connecting section 13b. The flange-like connecting section 13b is also connected here in a rotationally fixed fashion to the adjustment shaft 4. Said connecting section 13b serves at the same time for supporting a brake application spring 5a which is arranged axially about the adjustment shaft 4, between said connecting section 13b and the output wheel 5. The brake application spring 5a presses the clutch cover 13 with the inside of the wall section 13c against a friction element 26b and forms a first anti-rotation device. The friction element 26b is arranged in a rotationally fixed fashion on the coil carrier 26a of the external bearing 26, pointing to the brake lining 2 and surrounded by the clutch cover 13.

The external bearing 26 is attached in a rotationally fixed fashion with its section which is embodied as a disc and points to the transmission end 6 of the adjustment shaft 4, in a brake housing 24 of the disc brake (which is not illustrated in more detail). The external bearing 26 therefore forms a bearing for the adjustment shaft 4 in the brake housing 24. The surface of the section of the external bearing 26, which is designed as a disc and which points to the transmission end 6 of the adjustment shaft 4, is in contact with a friction disc 27 which is arranged in a rotationally fixed fashion on the adjustment shaft 4 at the axial stop 20 on the adjustment shaft 4. The friction disc 27 and the external bearing 26 form a second anti-rotation device. The first anti-rotation device and the second anti-rotation device form, for example, a torque resistance of approximately 2.4 Nm. Other values are, of course, also possible depending on the design.

FIG. 3 shows the chain 25 which connects, as a torque transmitting element, the transmission wheel 7 to another transmission wheel of a further adjustment shaft (not shown). The chain 25 is covered with a cover 24a, which cover is connected to the brake housing 24 in a manner not illustrated in more detail. A connection device 28 is arranged on this cover 24a in the region of the transmission end 6 of the adjustment shaft 4.

The connection device 28 includes the connecting element 19, a circuit board 29, the plug-type connection 31 and the lining wear sensor 8. The connecting lines 18 (see FIGS. 1 and 2) are embodied as conductor tracks of the circuit board 29 and connect, on the one hand, the plug-type connection 31 and a wear sensor element 8a to the connecting element 19.

The connecting element 19 can be designed, for example, as an angular plug. The plug-type connection 31 forms a pluggable connection between a plug-type connector 32, attached to the circuit board 29, and the conductor elements 34. The conductor elements 34 are fixed here in a securing device 33 which is received in a flexible fashion in the disc of the external bearing 26. The ends of the conductor elements 34 have connecting ends 34a which point to the brake lining 2 and to which the connection wires of the electromagnetic coil 16 are connected as a line 17. Other ends of the conductor elements 34 are plugged here into the plug-type connector 32 at the side of the circuit board 29 pointing to the brake lining 2. The conductor elements 34 are arranged for example in a free standing fashion as individually insulated, rigid metal wires, extending perpendicularly with respect to the chain 25. However, they can also be embedded in an insulating body, for example made of plastic or encapsulated by injection molding with insulating material. The plug-type connection 31 can also be constructed in such a way that the securing device 33 has the plug-type connector 32 pointing to the connection device 28, wherein the conductor elements 34 are fixedly attached to the circuit board 29 in an electrically conductive fashion.

The wear sensor element 8a, for example a Hall sensor element, is arranged on the side of the circuit board 29 pointing to the brake lining 2, opposite the end side of the transmission end 6 of the adjustment shaft 4. The Hall sensor element interacts as an angle sensor with a wear encoder element 8b, for example a permanent magnet which is positioned at the transmission end 6 of the adjustment shaft 4. The wear sensor element 8a is also electrically connected to the connection contacts of the connecting element 19, with the result that, for example, a plug can be used both for transmitting the electrical power for the electromagnetic coil 16 and the electrical signals of the lining wear sensor 8.

The wear sensor element 8a generates, as a function of the angular position of the wear encoder element 8b, an electrical signal (analog or digital) which is proportional to the angular position and which is evaluated in an associated evaluation circuit and is used further as a measure for the wear of the brake linings 2 and also the brake disc of the disc brake. This is described below in more detail.

The connection device 28 is arranged in a housing 30 and protected against external influences (ingress of dust and moisture, IP protection type) and access. The housing 30 is plugged in a modular fashion onto the cover 24a of the chain 25 and attached, for example, by way of jointly used screws. In another embodiment which is not illustrated but contemplated, the connection device 28 can be connected, for example, to the external bearing 26.

Figure 4:
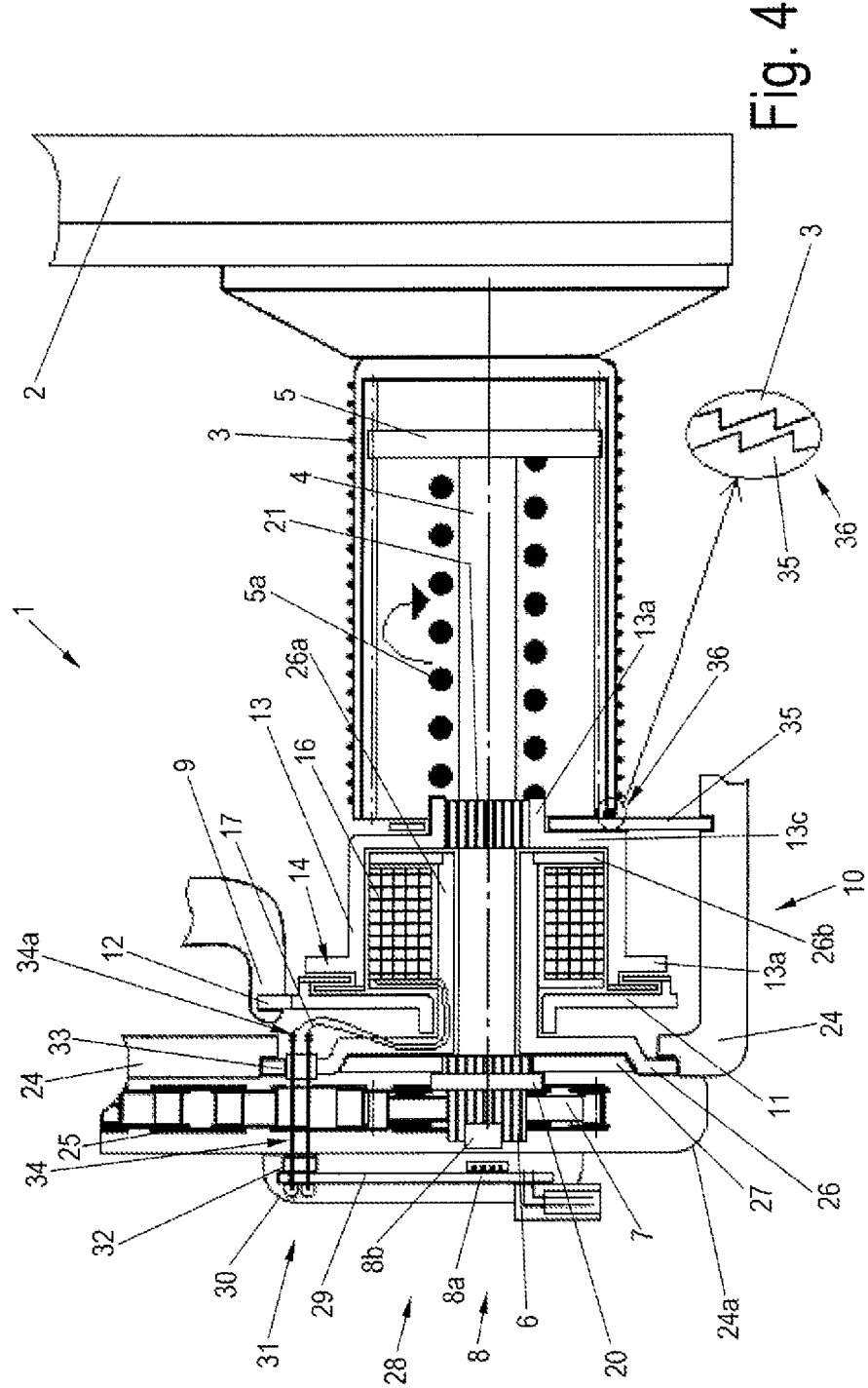
FIG. 4 shows a schematic sectional view of a variant of the second exemplary embodiment according to FIG. 3.

FIG. 4 shows a schematic sectional view of a variant of the second exemplary embodiment according to FIG. 3.

The use of two friction faces, specifically the friction element 26b with the internal wall section 13c as a first anti-rotation device and the friction disc 27 with the external bearing 26 as a second anti-rotation device increases the maximum possible frictional force and therefore also the overall reliability with respect to a failure of the anti-rotation device due to soiling.

The variant shown in FIG. 4 has, in contrast with the second exemplary embodiment according to FIG. 3, a ramp toothing system 36 which is illustrated in an enlarged form in a view of a detail. The ramp toothing system 36 comprises a toothing system on the end side of the adjustment spindle 3 which points to the clutch device 10, and a rotation limiting element 35 with a corresponding toothing system. The rotation limiting element 35 is attached at least in a rotationally fixed fashion to the brake housing 24 and is arranged between the clutch device 10 and the end side of the adjustment spindle 3. In this context, the rotation limiting element 35 has here a bore through which the connecting section 13b of the clutch cover 13 extends freely.

By means of this ramp toothing system 36, a rotational limitation can be achieved in the case of complete resetting of the lining wear adjustment device 1, without the risk of the spindle thread being tightened at the stop.

Figure 5:
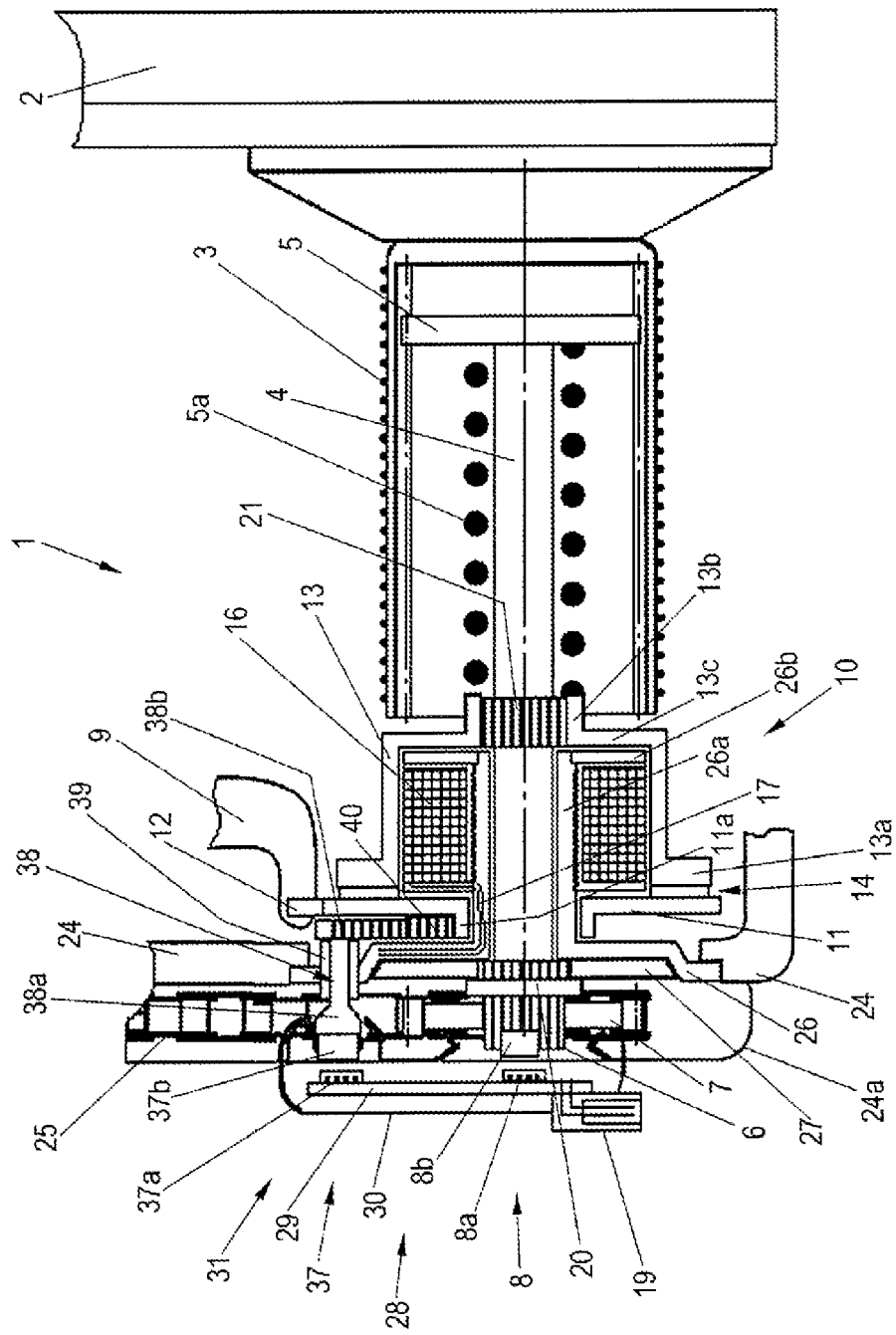
FIG. 5 shows a schematic sectional view of a third exemplary embodiment of the lining wear adjustment device according to the invention.

In a third exemplary embodiment of the lining wear adjustment device 1 according to the invention, which is shown in FIG. 5 in a schematic sectional view, the design is similar to the case of the second exemplary embodiment. The clutch section 14 is illustrated only symbolically. The plug-type connection 31 for connecting the electromagnetic coil 16 is present as in the previous example but cannot be seen.

The lining wear adjustment device 1 has an additional actuating lever sensor 37 in this third exemplary embodiment.

The actuating lever sensor 37 comprises an actuating sensor element 37a, an actuating encoder element 37b and a carrier shaft 38. The actuating sensor element 37a can be, like the wear sensor element 8a, for example a Hall sensor element and is arranged on the side of the circuit board 29 of the connection device 28 pointing toward the brake lining 2. The actuating lever sensor 37 is constructed here like the lining wear sensor 8, wherein the actuating sensor element 37a interacts with the actuating encoder element 37b as an angle sensor. The actuating encoder element 37b is, for example, also a permanent magnet which is arranged in a carrier section 38a at a thickened end of the carrier shaft 38. The section of the carrier shaft 38 which extends thereon to the brake lining 2 has a smaller diameter than the carrier section 38a and is rotatably received in a bearing 39, for example a brass or plastic bushing, in an edge section of the disc of the external bearing 26. The carrier shaft 38 extends parallel to the axis of the adjustment shaft 4 to above a flange section 11a of the rotary drive element 11. In an alternative embodiment, a center of rotation of the carrier shaft 38 interacts with a center of rotation of the bearing of the brake actuating lever 9. This allows optimum functioning of the angular transmission, i.e. the angular transmission is largely wear-free. The flange section 11a points toward the transmission end 6 of the adjustment shaft 4 and is provided with a toothed segment 40 and fixedly connected thereto. The toothed segment 40 is in engagement with a carrier toothing system 38b of the carrier shaft 38. The carrier toothing system 38b is integrally formed onto the end of the carrier shaft 38 arranged above the flange section 11a.

When the brake actuating lever 9 pivots, the rotary drive element 11 also rotates together with the toothed segment 40. In this context, the carrier shaft 38 rotates by means of the toothing systems of the toothed segment 40 and of the carrier toothing system 38b which are in engagement, and at the same time the actuating encoder element 37b of the actuating lever sensor 37 pivots. In this way, a pivoting movement of the brake actuating lever 9 is detected by the actuating lever sensor 37 and passed on as an electrical analog and/or digital signal via the circuit board 29 to the connecting element 19 for further use, which will be explained in more detail below. The connecting element 19 can therefore be used for transmitting the electrical power for the electromagnetic coil 16 and the electrical signals of the lining wear sensor 8 and of the actuating lever sensor 37.

FIG. 6 shows a schematic sectional view of a fourth exemplary embodiment of the lining wear adjustment device 1 according to the invention.

The connection device 28 is equipped, as in the third exemplary embodiment, with the lining wear sensor 8, the plug-type connection 31 and the actuating lever sensor 37.

The clutch section 14 is embodied here as a toothed clutch. A toothing system of the clutch section 14 is arranged on the rotary drive element 11. The toothing system which corresponds thereto is integrally formed onto the clutch region 13a of the clutch cover 13 or provided thereon. The clutch cover 13 extends, as in the preceding exemplary embodiments, parallel to the axis of the adjustment shaft 4, wherein the radial wall section 13c is not connected to the adjustment shaft 4 but rather forms a component of an overload clutch 41.

The overload clutch 41 is designed here as what is referred to as a ball ramp clutch with balls 42 and a disc-like clutch element 43. The clutch element 43 is operatively connected by its side pointing to the brake lining 2 to the wall section 13c of the clutch cover 13 via the balls 42. The side of the clutch element 43 which points to the transmission end 6 of the adjustment shaft 4 forms, with the friction element 26b, the first anti-rotation means of the lining wear adjustment device 1. The clutch element 43 is connected in a rotationally fixed fashion to the adjustment shaft 4 on the axial stop 21 by means of a flange.

The overload clutch 41 is prestressed axially by the brake application spring 5a between the output wheel 5 and the wall section 13c. Furthermore, a release spring 13d is arranged on the cylindrical outer side of the clutch cover 13 between the rotary drive element 11 and a stop which is integrally formed onto the outer side of the clutch cover 13, said release spring 13d seeking to press the clutch section 14 apart in the axial direction of the adjustment shaft 4, i.e. to move the clutch device 10 into the disengaged, released position.

In this fourth exemplary embodiment, the electromagnetic coil 16 can be made smaller than the previous one, since it only has to apply the electromagnetic force for clutch the clutch section 14, specifically for causing the toothing systems to engage. During this clutch there is no need for any friction linings to be pressed against one another with a specific normal force in order to transmit a torque. The torque is transmitted by the teeth which are placed in engagement.

FIG. 7 illustrates a schematic sectional view of a variant of the fourth exemplary embodiment according to FIG. 6. The actuating lever sensor 37 is not shown, but can easily be imagined.

In this variant, the external bearing 26 is embodied in the shape of a bell, wherein the coil carrier 26a thereof merges with the disc of the external bearing 26 in an arcuate shape. The securing device 33 for the plug-type connection 31 is received in the edge region of the external bearing 26. The securing device 23 can be attached in the external bearing 26, but in this context it can be connected fixedly in terms of movement to the housing 24. It can be embodied in an elastic, i.e. flexible fashion, between this attachment and the connecting ends 34a. The connecting ends 34a extend here to just before the electromagnetic coil 16 in a region between the external bearing 26, the electromagnetic coil 16 and a securing ring 26b to which the flange section 11a of the rotary drive element 11 is secured. The region in which the connecting ends 34a and the securing ring 26g are located can, for example, be sealed with plastic. The profile of magnetic force lines 44 for the energized case of the electromagnetic coil 16 is indicated, which profile is directed through the structure of the external bearing 26 and the arcuate junction to the coil carrier 26a in such a way that it does not run, or runs only to a small degree, through the adjustment shaft 4. That is to say the magnetic dissipated field of the electromagnetic coil 16 has become narrower, as a result of which an increase in force for the clutch of the clutch device 10 can be brought about. The stop of the release spring 13d is formed here as a radial extension of the wall section 13c of the clutch cover 13. The clutch element 43 is shown with a clutch element flange 43a with which it is attached in a rotationally fixed fashion to the adjustment shaft 4. Instead of the friction disc 27, an anti-rotation element 45 is provided which forms the second anti-rotation means in an axial securing device 26c with the external bearing 26. The first anti-rotation device is formed by a section of the end side of the fixed coil carrier 26a which points to the brake lining 2, and the clutch element flange 43a.

The external bearing 26 is provided with a cardanic suspension or bearing 26e for the adjustment shaft 4. This is illustrated schematically in FIG. 8 in an enlarged plan view. The transmission end 6 of the adjustment shaft 4, which supports the wear sensor element 8a, is arranged in the cardanic bearing 26e, as a result of which stresses of the adjustment shaft 4 at this end are avoided and the accuracy of the lining wear sensor 8 is increased. The external bearing 26 is attached to the brake housing 24 with radial securing means 26c and axial securing means 26d.

Figure 10:
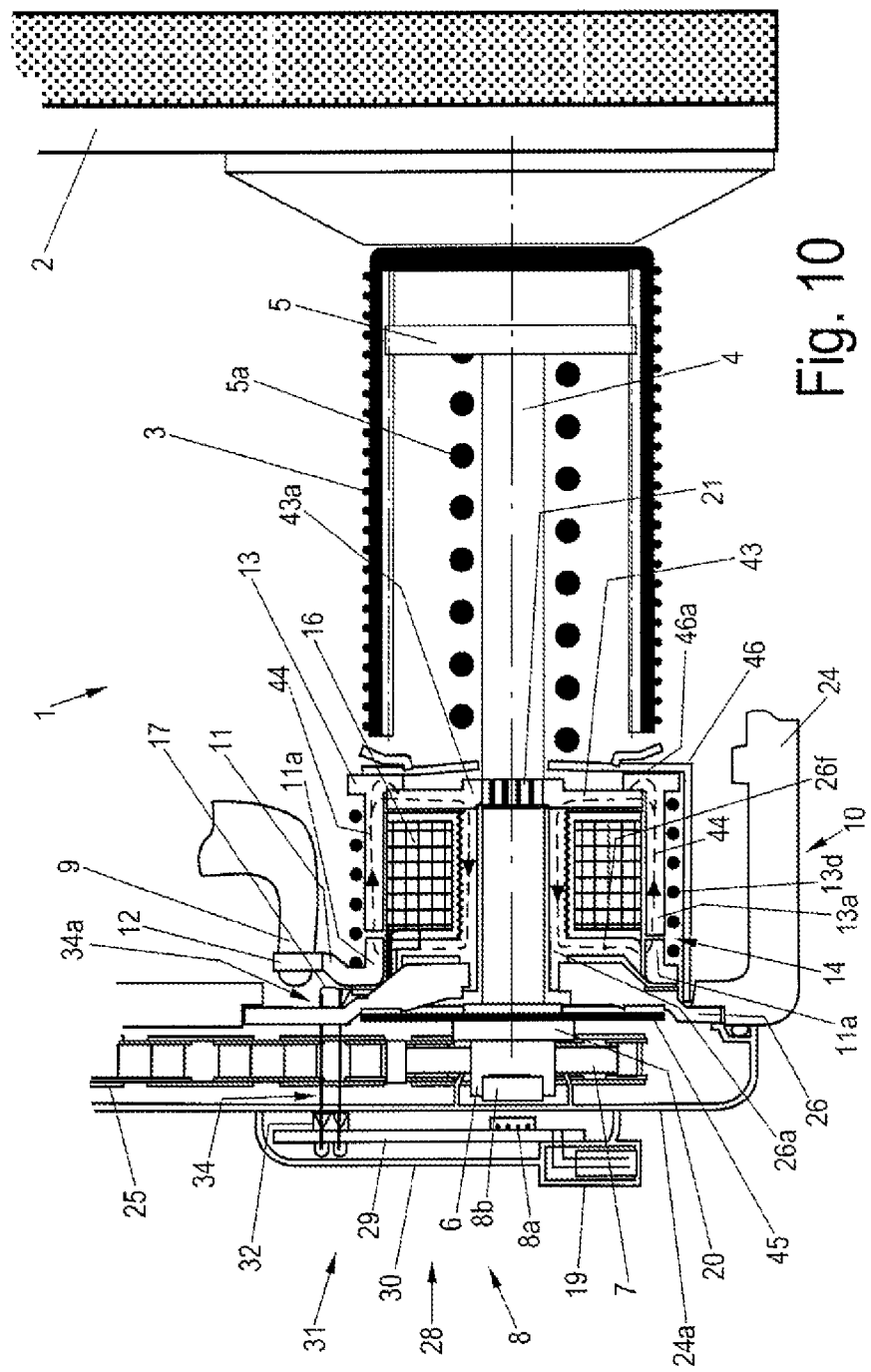
Figure 11:
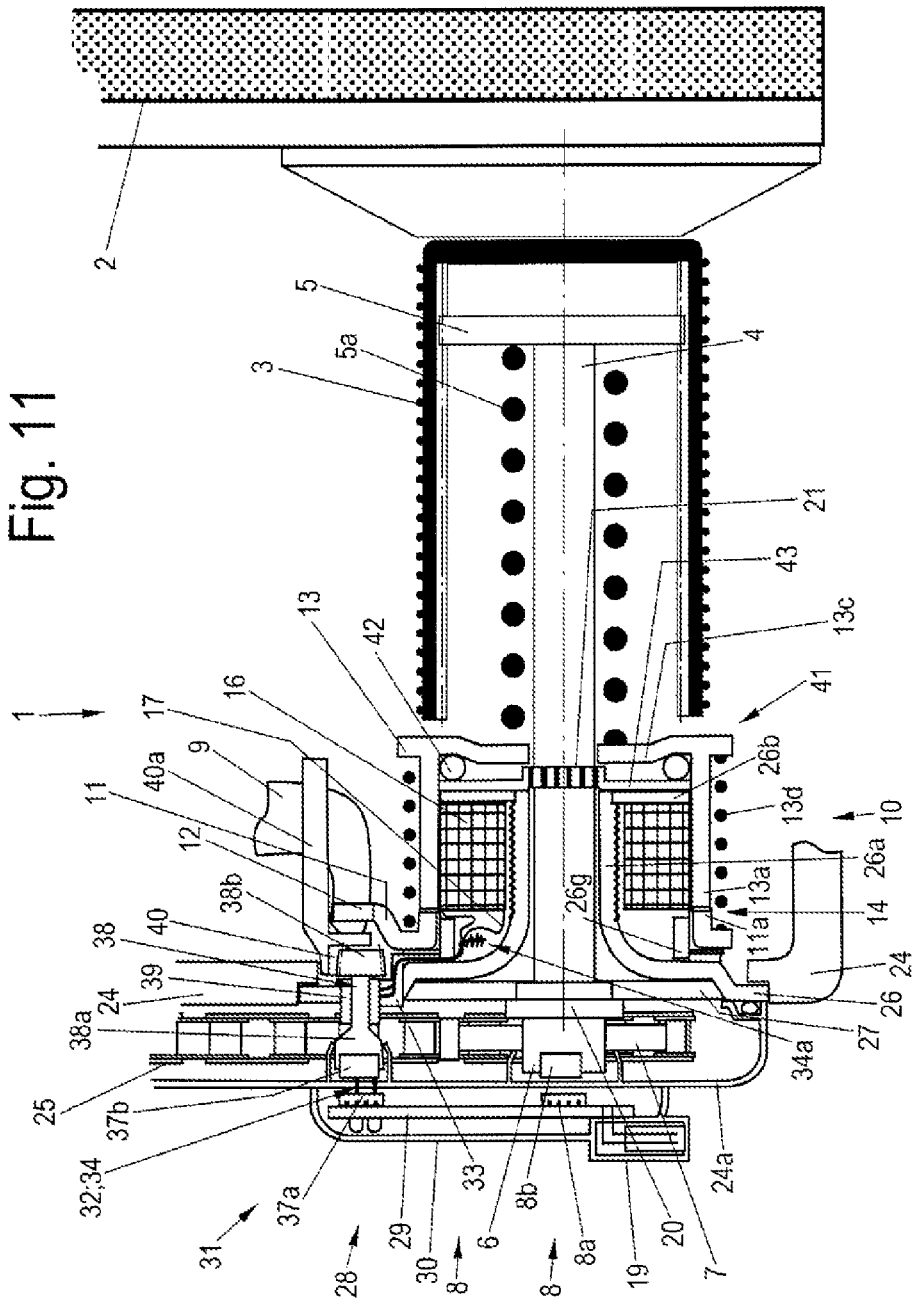

FIGS. 9 to 11 illustrate schematic sectional views of further variants of the fourth exemplary embodiment according to FIG. 6.

All the variants of FIGS. 9 to 11 have the toothed clutch section 14 described above. Even if the actuating lever sensor 37 is not shown, it can be present in each case, as can easily be imagined.

In the variant shown in FIG. 9, the external bearing 26 is embodied with shoulders, in contrast to the variant according to FIG. 7. The coil carrier 26a runs between the electromagnetic coil 16 and the adjustment shaft 14 parallel thereto as a tubular section and bends on the side which points to the transmission end 6 of the adjustment shaft 4, by essentially 90° radially outward to under the flange section 11a. The electromagnetic coil 16 is therefore also secured on the side of the coil carrier 26a pointing to the transmission end 6 of the adjustment shaft 4. As a result, the profile of the magnetic force lines 44 is improved. The external bearing 26 with the coil carrier 26a is manufactured, for example, from a metallic material, such as for example iron, which is suitable for conducting the magnetic force lines 44. The disc of the external bearing 26 can therefore be embodied as shown in FIG. 8.

The external bearing 26 runs again parallel to the adjustment shaft 4 under the flange section 11a and forms the type of shoulder which forms a radial securing means for the flange section 11a, about which the rotary drive element 11 can pivot. This shoulder then merges again with a further shoulder and then with the disc of the external bearing 26.

The securing device 33 for the plug-type connection 31 is also received here in the edge region of the external bearing 26. The connecting ends 34a extend here to just before the section of the coil carrier 26a which runs radially outward. In a variant which is not shown, the connecting ends 34a can, however, also be arranged as embodied in FIGS. 3 and 4.

The external bearing 26 is composed of two components in the variant of the fourth exemplary embodiment which is illustrated in FIG. 10. The disc of the external bearing 26 is a separate part which is embodied from a material, for example plastic. It can have elastic properties in the region of the plug-type connection 31 in order to compensate stresses and offsets of the adjustment shaft 4. Furthermore, this disc of the external bearing 26 is provided with greater thickness in the axial direction of the adjustment shaft 4 in the central region about the latter than in the attachment regions on the brake housing. In this central region with greater thickness a bore is formed in which a cylindrical section of the coil carrier 26a is inserted. The coil carrier 26a has between the external bearing 26 and the electromagnetic coil 16a radially outwardly extending disc section 26f which is axially widened at its outer circumference. This axial widening serves to support the flange section 11a of the rotary drive element 11.

The side of the clutch cover 13 of the clutch device 10 which points toward the brake lining 2 has an edge section which protrudes radially inward and radially outward. The edge section of the clutch cover 13 which protrudes radially outward serves as a counter bearing for the release spring 13d. The clutch element 43 is arranged between the radially inwardly protruding edge section and the electromagnetic coil 16 which is attached to the coil carrier 26a. An edge section of the clutch element 43, which is in contact with the radially inwardly protruding edge section of the clutch cover 13, forms therewith the first anti-rotation means as an overload clutch 41 in the form of an overload slipping clutch (for example >10 Nm) by means of a toothing system. This overload slipping clutch is held together over a pressure section 46a by means of a sleeve-like stop limiting element 46 which engages at least partially around the clutch cover 13, and an axial force is applied to said overload slipping clutch in the direction of the transmission end 6 of the adjustment shaft 4 via the brake application spring 5a.

FIG. 11 shows a variant of the fourth exemplary embodiment with the bell-shaped external bearing 26, the connecting ends 34a of the plug-type connection 31 which are arranged right next to the electromagnetic coil 16, and the securing ring 26g (see FIG. 7), wherein the overload clutch 41 with balls 42 and the clutch element 43 is additionally combined with the friction element 26b as a first anti-rotation device.

In this variant, the drive of the carrier shaft 38 of the actuating lever sensor 37 is designed with a toothed segment holder 40a for the toothed segment 40. Here, the toothed segment holder 40a is attached directly to the brake actuating lever 9 since the rotary drive element 11 is pivotably arranged on the securing ring 26g at the level of the clutch cover 13. The toothed segment 40 is in engagement here with the carrier toothing system 38b, on the side of the carrier shaft 38 facing away from the adjustment shaft 4.

Figure 12:
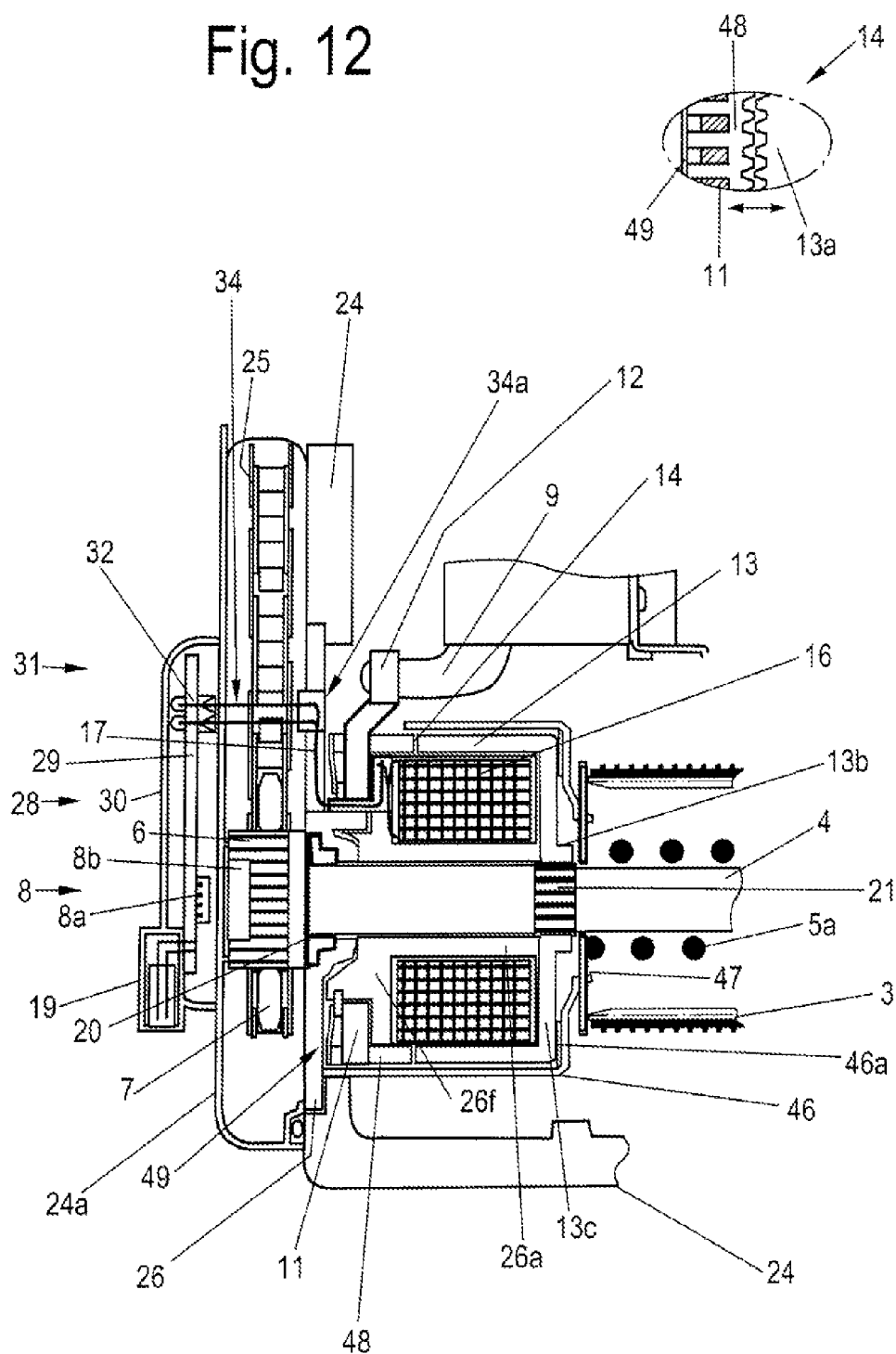
FIG. 12 shows a schematic sectional view of a fifth exemplary embodiment of the lining wear adjustment device according to the invention.

FIG. 12 shows a schematic sectional view of a fifth exemplary embodiment of the lining wear adjustment device 1 according to the invention.

In contrast to the preceding exemplary embodiments, the external bearing 26 is composed of two components in the fifth exemplary embodiment. The disc of the external bearing 26 is a separate part which is embodied from a material, for example plastic. The coil carrier 26a supports the electromagnetic coil 16. The coil carrier 26a has a disc section 26f pointing toward the external bearing 26, said disc section 26f having a shell receptacle which is spherical in the central region and corresponds to a corresponding spherical projection of the disc of the external bearing 26, receives the latter and interacts with the external bearing via the latter. The external bearing 26 is also provided with an anti-rotation device at the line 17 of the coil connection wires of the electromagnetic coil 16. Angular movements of the lining wear adjustment device 1 can therefore be compensated during actuation. The line 17 is merely secured to the output of the plug-type connection 31 (connecting ends 34a) on a coil former of the electromagnetic coil 16, with the result that it can compensate the angular movements (approximately ±0.5°) in a bending fashion.

The rotary drive element 11 is pivotably attached to a protrusion of the disc section 26f. In the direction of the transmission end 6 of the adjustment shaft 4, the rotary drive element 11 is secured axially, for example by a shaft securing ring, i.e. the rotary drive element 11 is axially nondisplaceable. In the opposing direction to this, i.e. in the direction of the clutch cover 13, the rotary drive element 11 is coupled in a rotationally fixed fashion to a clutch element 48 which lies at the level of the clutch cover 13 of the clutch device 10 and is axially displaceable. The clutch section 14 which is formed from the clutch element 48 and the clutch region 13a is embodied as a toothed clutch with an oblique angle. The toothing system is illustrated top right in the enlarged illustration of a detail in FIG. 12. The clutch element 48 has the clutch teeth of the clutch section 14 on the side pointing toward the brake lining 2. The clutch teeth interact with corresponding clutch teeth of the clutch region 13a of the clutch cover 13. On the opposite side of the clutch teeth of the clutch element 48, projections of the clutch element 48 extend through the rotary drive element 11. The ends of these projections of the clutch element 48 are also in contact, on the side pointing toward the transmission end 6 of the adjustment shaft 4, with a resetting spring 49, for example a circumferential sprung sheet metal ring. The resetting spring 49 serves to reset the clutch device 10 into the released position which is shown in FIG. 12. In the released position, the clutch teeth of the clutch section 14 are disengaged. In other words, when the electromagnetic coil 16 is energized the clutch element 48 is displaced axially in the direction of the brake lining 2 (double arrow) and the clutch teeth of the clutch element 48 enter into engagement with the clutch teeth of the clutch cover 13. The clutch element 48 also continues to be in engagement with the rotary drive element 11 by means of the rotationally fixed connection (projections of the clutch element 48), and in this way said clutch element 48 can transmit the pivoting movement of the rotary drive element 11 to the clutch cover 13 and therefore to the adjustment shaft 4.

The oblique angle of the clutch teeth of the clutch section 14 which is designed as a toothed clutch is configured in such a way that in the case of overloading the clutch teeth of the clutch section 14 become released. This oblique angle can be, for example, in the range of 20°. The junctions of the edges of the clutch teeth with the tooth heads of the clutch teeth can be rounded in order to permit a soft engagement.

The overload point can be varied by adapting the magnetic field strength of the electromagnetic coil 16, for example by means of PWM actuation (PWM: pulse width modulation). It is also possible to determine the securing friction together with the frictional force of the adjustment spindle 3 by means of the PWM actuation. The overload torque can therefore be detected precisely by means of corrected PWM actuation.

The stop limiting element 46 is embodied as a pot-shaped cover of the clutch device 10 and is provided with a cutout in the region of the brake actuating lever 9. An additional friction face, for example by means of a friction disc, for the first anti-rotation device is made possible by the pressure section 46a, which interacts with the clutch cover 13, i.e. with the edge region of the wall section 13c which is closed here. The stop limiting element 46 is coupled in the direction of the adjustment spindle 3 with a pressure disc 47 which interacts in turn with the brake application spring 5a and covers the adjustment spindle 4 at the end side.

In order to avoid disruptive influences of the obliquely applied actuating force of the brake actuating lever 9 owing to an axial height offset between the bearing of the brake actuating lever 9 and the brake lining adjustment device 1, the rotary drive element 11 can be connected via an intermediate element, in a rotating fashion by means of a perpendicular toothing system. In this way, the torque for the overload can be determined more precisely.

Figure 13:
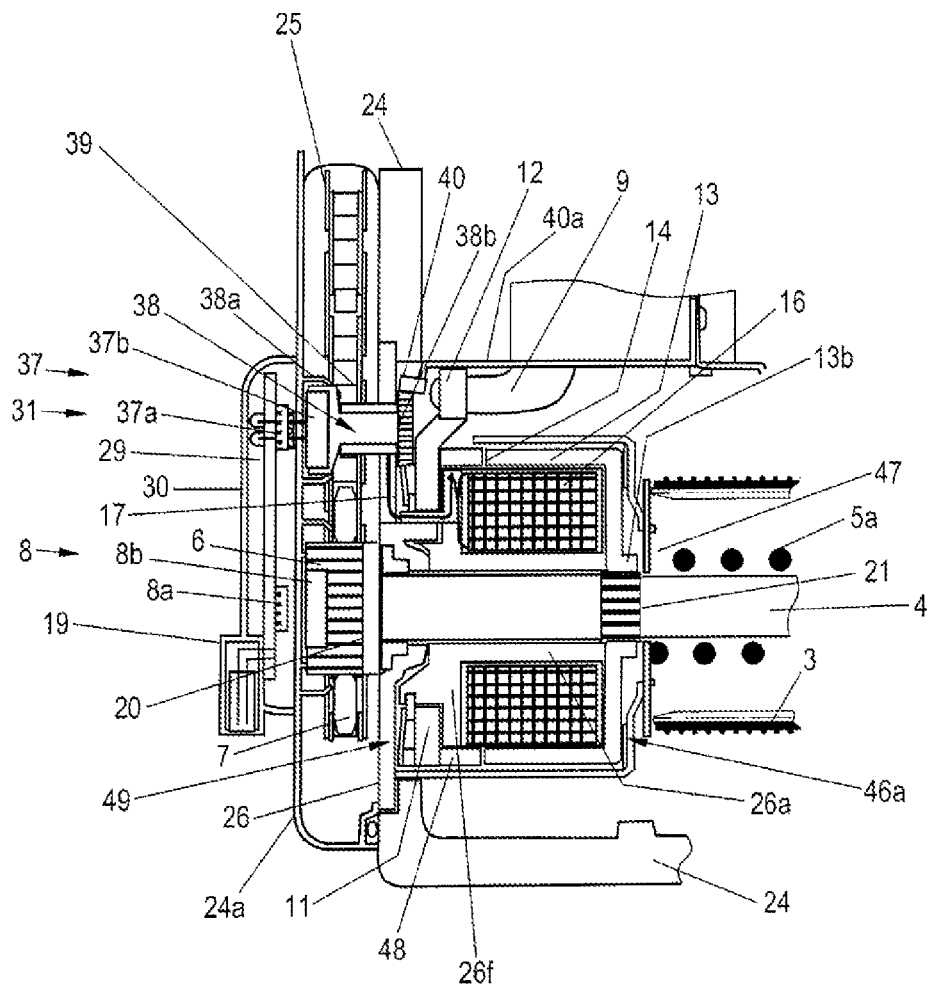
FIG. 13 shows a schematic sectional view of a variant of the fifth exemplary embodiment according to FIG. 12.

FIG. 13 illustrates a schematic sectional view of a variant of the fifth exemplary embodiment according to FIG. 12, wherein the actuating lever sensor 37 described at the top in relation to FIG. 11 is provided. The actuation of the carrier shaft 38 of the actuating lever sensor 37 is embodied by means of the toothed segment 40, which is arranged on the toothed segment holder 40a. The toothed segment holder 40a can be, for example, a punched bent part made of sheet metal. In this context, it can have a certain elasticity for axial play compensation. The toothed segment 40 is arranged obliquely, as a result of which angular errors can be minimized.

FIG. 14 shows a schematic block circuit diagram of the second exemplary embodiment according to FIG. 3.

The connection device 28 is arranged on the disc brake and has the connecting element 19 in the form of a five-pin plug-type connector. The lining wear sensor 8 is shown with the wear sensor element 8a, for example a Hall sensor element, and the wear encoder element 8b, for example a permanent magnet with North Pole N and South Pole S. The wear sensor element 8a is connected to the terminals LWS A+(supply voltage 4.3 . . . 7V-max. ±16VDC, LWS A Signal (signal output) and LWS A Gnd (ground) of the connecting element 19.

Furthermore, the electromagnetic coil 16 of the clutch device 10 is connected via the plug-type connection 31 to the terminals LWC A+(supply voltage) and LWC A Gnd (ground) of the connecting element 19.

The connecting element 19 is connected to a connecting element 19a of a controller 50 via a multi-conductor cable. The controller 50 makes available the supply voltage, for example 5 V, and the ground terminal for the wear sensor element 8a as well as the supply voltage +UB (with ground terminal) for the electromagnetic coil 16 of the clutch device 10. The controller 50 has a control unit 51, for example a microcomputer, for processing the signal of the wear sensor element 8a. Furthermore, the control unit 51 is provided for controlling a clutch switch 52. The clutch switch 52 serves to switch on the electromagnetic coil 16 by connecting it to the supply voltage +UB. The clutch switch 52 can be, for example, a relay and/or a semiconductor switch.

The lining wear sensor 8 detects wear travel by means of the described angle sensor system over a plurality of rotations of the adjustment shaft 4. The wear sensor element 8a outputs the detected travel and/or the detected angles as an analog signal and/or as a digital signal, for example PWM signal, with a resolution of, for example, 12 bits. The signal is processed by the control unit 51 by means of evaluation software in such a way that the lining wear of the disc brake is present as an electrical signal or value which can be evaluated further. The controller 50 can be, for example, what is referred to as a pressure regulating module and/or brake control unit.

The lining wear which is detected in this way is then compared as an electrical signal or correspondingly stored digital value with a presettable value which corresponds to a degree of wear at which adjustment is to take place. If this presettable value is reached, the clutch device 10 is thus activated, in that the electromagnetic coil 16 is switched on by the control unit 51 by means of the clutch switch 52 when the brakes are next applied, i.e. during the brake application movement of the brake actuating lever 9, and is switched off again during the return movement of the brake actuating lever 9. For this purpose, the control unit 51 receives a switch-on and switch-off signal, for example from the brake control unit.

FIG. 15 shows a schematic illustration of a customary plug assignment on a pressure regulating module for two disc brakes A, B, each of the potentiometers as a lining wear sensor (see for example FIG. 1). The entire plug has 14 pins.

FIGS. 16 and 17 show schematic illustrations of various plug assignments of the connecting elements 19 of the second exemplary embodiment according to FIG. 3. In FIG. 16, an additional 6-pin plug is necessary since the terminals LWC A, B become necessary for the electromagnetic coil 16 of the respective clutch device 10. The common ground can also continue to be used for this purpose. The previous terminals LWS A, B for the lining wear sensor can continue to be used. The entire plug has 20 pins.

FIG. 17 shows a variant of the connecting element 19 with the use of three 6-pin plugs with a mixed distribution. The entire plug has 18 pins.

Figure 18:
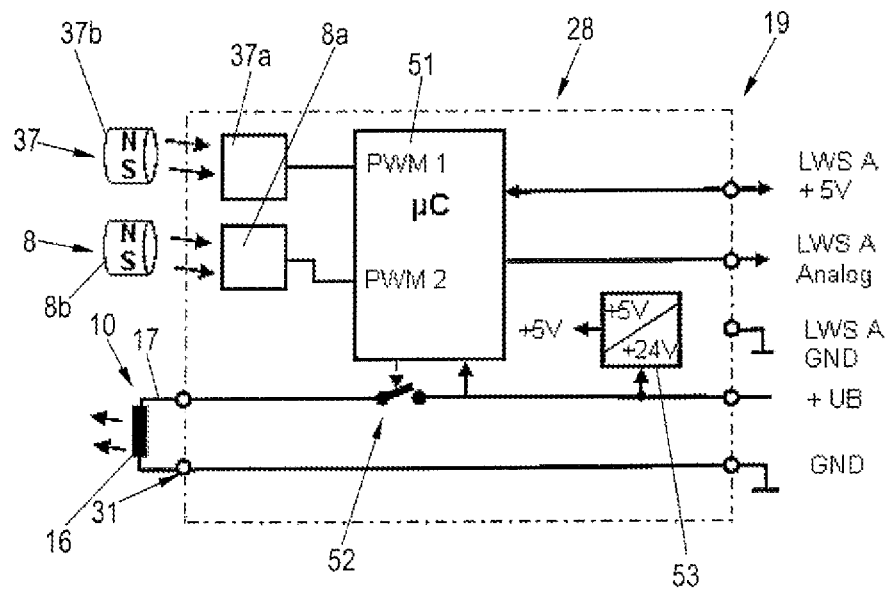
FIG. 18 shows a schematic block circuit diagram of the third and fourth exemplary embodiments according to FIGS. 5 and 6.

FIG. 18 shows a schematic block circuit diagram of the third and fourth exemplary embodiments according to FIGS. 5 and 6 in the form of a so-called stand-alone version.

In the connection device 28, the control unit 51 is arranged, for example as a microcomputer, on the circuit board 29 on the disc brake (indicated by the dot-dash box). The lining wear sensor element 8a, the actuating sensor element 37a and the clutch switch 52 are likewise mounted thereon and connected to the control unit 51. Furthermore, the encoder elements 8 and 37 are indicated schematically as permanent magnets with effect arrows. The electromagnetic coil 16 of the clutch device 10 is connected via the line 17 to the plug-type connection 31. The plug-type element 19 has five pins. It comprises the terminals for a 5 V voltage supply, the ground of the sensors, the signal output of the sensors, UB voltage supply of the electromagnetic coil 16 (for example 24 V) and the ground thereof. In this exemplary embodiment, an additional voltage regulator 53 is arranged which makes available a regulated 5 V voltage from the UB voltage supply.

This embodiment is designed to simulate the potentiometer which is specified above and is fully backwards compatible. It can be embodied as a stand-alone version as well as with automatic detection of a pressure regulating module (PRM) and with corresponding digital output.

Figures 19, 20:
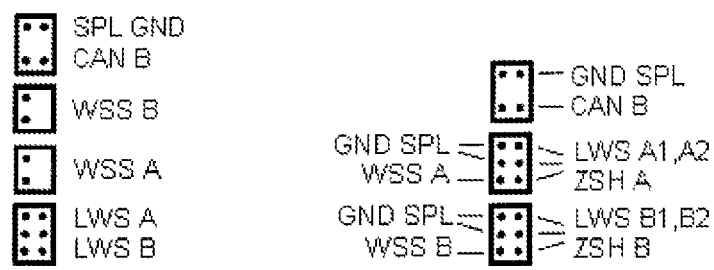
FIG. 19 shows a schematic illustration of a customary plug assignment.
FIG. 20 shows a schematic illustration of a plug assignment of the third and fourth exemplary embodiments according to FIGS. 5 and 6.

FIG. 19 shows, like FIG. 15, a schematic illustration of a customary plug assignment of a pressure regulating module.

FIG. 20 is a schematic illustration of a plug assignment of the third and fourth exemplary embodiments according to FIGS. 5 and 6 of the connecting element 19 with the use of three 6-pin plugs with a mixed distribution. The entire plug has 16 pins.

Figure 21:
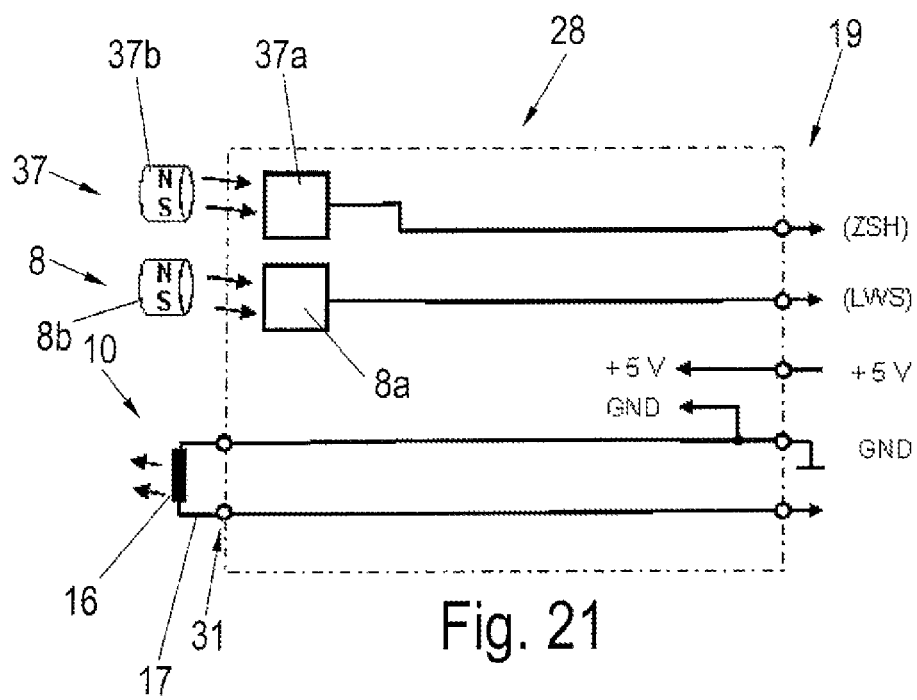
FIG. 21 shows a further schematic block circuit diagram of the third and fourth exemplary embodiments according to FIGS. 5 and 6.

FIG. 21 shows a further schematic block circuit diagram of the third and fourth exemplary embodiments according to FIGS. 5 and 6. In this embodiments forms, a so-called integrated solution is illustrated in which the evaluation circuit, i.e. the control unit 51, is a component of a pressure regulating module (see also FIG. 14). There is therefore no need for a control unit 51 on the circuit board 29 of the connection device 28. The circuit board 29 is equipped with the connecting element 19, the plug-type connection 31, the lining wear sensor element 8a and the actuating sensor element 37a. The connection assignment of the connecting element 19 has a common ground, the voltage supply 5 V and UB for the electromagnetic coil 16 and the signal output LWS as angle sensor signal of the lining wear sensor 8 and ZSH as angle sensor signal of the actuating lever sensor 37.

Figures 22, 23:
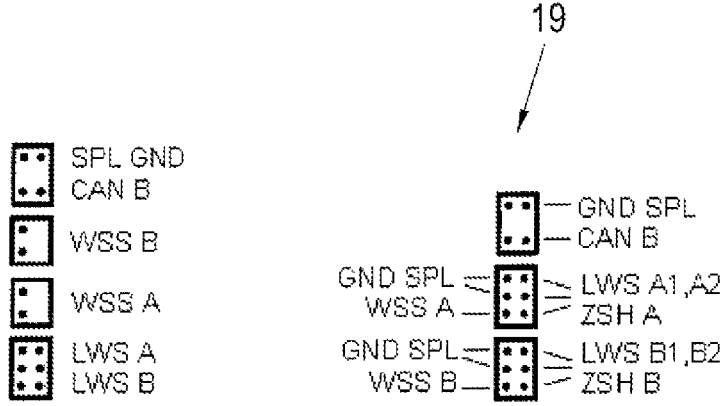
FIG. 22 shows a schematic illustration of a customary plug assignment.
FIG. 23 shows a schematic illustration of a further plug assignment of the third and fourth exemplary embodiments according to FIGS. 5 and 6.

FIG. 22 is a schematic illustration of a customary plug assignment with 14 pins as in FIGS. 15 and 19.

FIG. 23 shows a schematic illustration of a further plug assignment of the third and fourth exemplary embodiments according to FIGS. 5 and 6 with a 16-pin plug.

Figure 24:
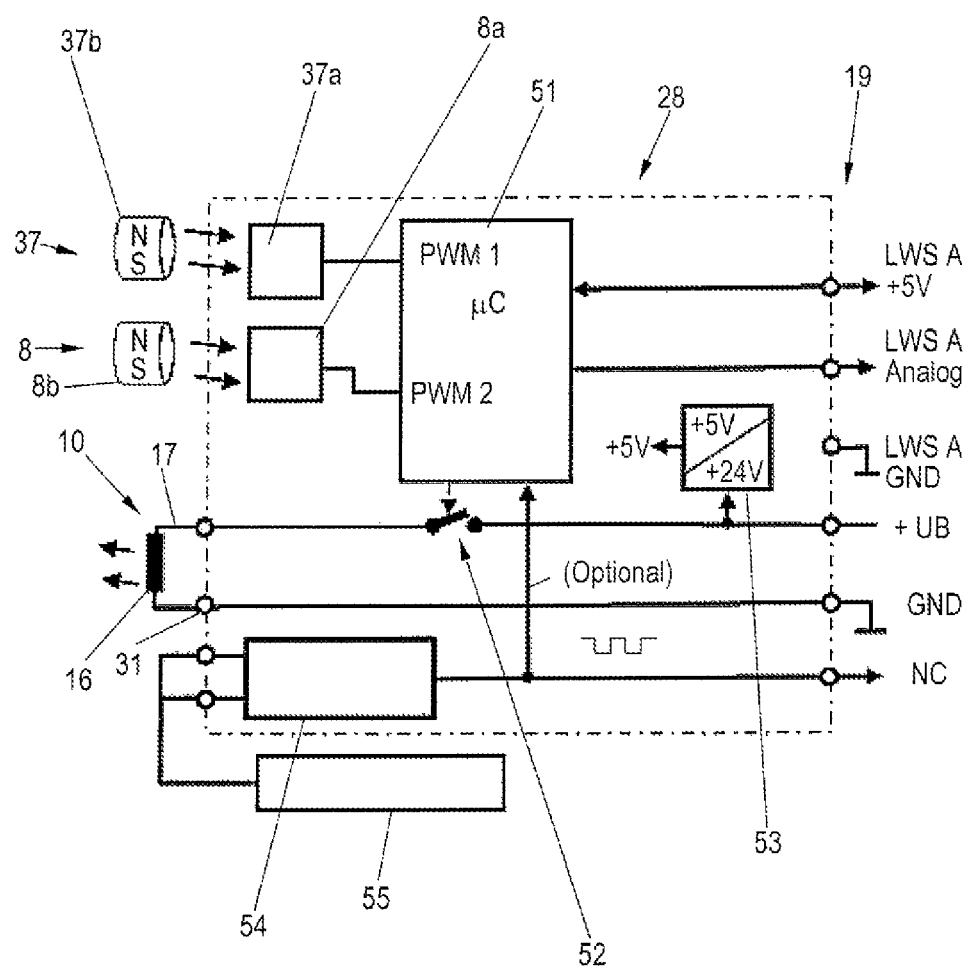
FIG. 24 shows yet a further schematic block circuit diagram of the third and fourth exemplary embodiments according to FIGS. 5 and 6.

FIG. 24 shows a further schematic block circuit diagram of the third and fourth exemplary embodiments according to FIGS. 5 and 6.

The basis of this embodiment is the design according to FIG. 18. In addition to this, the circuit board 29 in the connection device has a signal conditioning device 54 for a rotational speed signal of rotational speed sensor 55 of the wheel which is associated with the disc brake. The line of the rotational speed sensor 55 is connected in a suitable way, for example a plug-type connector, to the circuit board 29. The rotational speed signal is then processed by the signal conditioning device 54 in such a way that a digital or else analog signal which is not sensitive to electromagnetic interference is generated and is conducted via the connecting element 19 via terminal NC to the other terminals in a common cable to the control unit or pressure regulating module. As a result, plugs and corresponding line lengths for the connection of the rotational speed sensor 55 to the control unit or pressure regulating module are dispensed with. The output of the signal conditioning device 54, which is connected to the terminal NC of the connecting element 19, can optionally also be connected to the control unit 51. In this way, the control unit 51 can detect a rotational movement of the wheel and therefore of the associated brake disc. This can be used for different purposes, for example as an additional peripheral condition during the evaluation of the signals of the sensors 8 and 37.

In the stand-alone version, a friction point, i.e. application of the brake lining 2 to the brake disc of the disc brake, can be detected via the frictional engagement of the adjustment spindle 4 by means of the lining wear adjustment device 1 with the lining wear sensor 8 and sensing of the brake actuating lever 9, for example with the actuating lever sensor 37 (see for example FIG. 5). This is done, for example, by virtue of the fact that when the actuating movement of the brake actuating lever 9 is sensed, no adjustment by means of the lining wear sensor 8 is detected, i.e. adjustment is blocked.

Adjustment occurs when the lining wear is detected after a pre settable comparison value is reached through energization of the electromagnetic coil 16 of the clutch device 10 just before the start of brake actuation by the brake actuating lever 9. Of course, it is also possible to switch the clutch device 10 on and off at any time during the time profile of the brake actuation.

In the integrated version together with an active pressure regulating module, the friction point can be determined by measuring the brake pressure and the movement of the brake actuating lever 9 when the set point pressure is reached. In this context, the possible travel displacement of a measured characteristic curve value with respect to a stored set point characteristic curve can be evaluated.

Furthermore, it is possible to reset the lining wear adjustment device 1 by energizing the electromagnetic coil 16 of the clutch device 10 by means of a backward movement of the brake actuating lever 9 if the brake lining 2 bears against the brake disc without brake application tension and grinds. For this purpose, for example temperature sensors can be arranged at a suitable location in the vicinity of the brake lining 2 or the carrier thereof, the temperature values of which sensors are compared with stored temperature values when brake application tension is not applied to the disc brake. If excessively high temperatures occur in this context, the criterion for this can be that the brake lining 2 bears against the brake disc and grinds.

Since the rotary drive lever 11 is loaded by transmission of a torque only in the case of an adjustment process or resetting process, i.e. when the electromagnetic clutch is energized, in the case of a non-energized electromagnetic clutch the rotary drive lever is pivoted but only a negligibly small amount of energy is required for this in contrast with an adjustment process. This means, for example, that the energy for supplying compressed air to a compressed air brake can be smaller compared to the prior art. The rotary drive lever 11 can be, for example, a punched bent part.

Furthermore, in the event of a failure of the 5 V supply voltage of the sensor system, the clutch switch 52 can be switched on, for example by means of an OR logic operation in its actuation during each braking process, with the result that adjustment is further ensured.

The invention is not restricted to the exemplary embodiments described above. It can of course also be modified within the scope of the appended claims.

It is therefore contemplated that sensing of the pivoting movement of the brake actuation lever 9 can take place in a way other than that described above.

The electromagnetic coil 16 can also have two or more coils.

Instead of the basic design according to FIG. 18, in one embodiment according to FIG. 24 the basic design of the integrated version according to FIG. 14 or 21 can of course also be used.

The connection device 28 can, for example, also contain connection possibilities for a parking brake as a central connection device on the brake. Central routing and laying of the cable to the brake is therefore possible.

LIST OF REFERENCE SYMBOLS

1 Lining wear adjustment device
2 Brake lining
3 Adjustment spindle
4 Adjustment shaft
5 Output wheel
5a Brake application spring
6 Transmission end
7 Transmission wheel
8 Lining wear sensor
8a Wear sensor element
8b Wear encoder element
9 Brake actuating lever
10 Clutch device
11 Rotary drive element
11a Flange section
12 Tooth engagement section
13 Clutch cover
13a Clutch region
13b Connecting section
13c Wall section
13d Release spring
14 Clutch section
15 Clutch gap
16 Electromagnetic coil (solenoid)
17 Line
18 Connecting line
19, 19a Connecting element
20, 21 Axial stop
22, 23 Friction lining
24 Brake housing
24a Cover
25 Chain
26 External bearing
26a Coil carrier
26b Friction element
26c Axial securing device
26d Radial securing device
26e Cardanic bearing
26f Disc section
26g Securing ring
27 Friction disc
28 Connection device
29 Circuit board
30 Housing
31 Plug-type connection
32 Plug-type connector
33 Securing device
34 Conductor element
34a Connecting ends
35 Rotation limiting element
36 Ramp toothing system
37 Actuating lever sensor
37a Actuating sensor element
37b Actuating encoder element
38 Carrier shaft
38a Carrier section
38b Carrier toothing system
39 Bearing
40 Toothed segment
40a Toothed segment holder
41 Overload clutch
42 Ball
43 Clutch element
43a Clutch element flange
44 Magnetic force line
45 Anti-rotation element
46 Stop limiting element
46a Friction section
47 Pressure disc
48 Clutch element
49 Resetting spring
50 Controller
51 Control device
52 Clutch switch
53 Voltage regulator
54 Signal conditioning device
55 Rotational speed sensor
N, S Permanent magnetic poles The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A lining wear adjustment device for a disc brake having a brake application device with a brake actuating lever and an adjustment spindle, the lining wear adjustment device being configured to be operatively arranged between the brake actuating lever and the adjustment spindle, comprising:
  an adjustment shaft having an external bearing, the adjustment shaft being configured to be co-axially arranged with the adjustment spindle and to cooperate with the adjustment spindle to linearly displace the adjustment spindle along a adjustment spindle longitudinal axis when the adjustment shaft rotates about the longitudinal axis;
  a rotary drive element drivable by the brake application lever to rotate about the longitudinal axis; and
  a clutch device operatively configured to controllably couple the rotary drive element to the adjustment shaft, the clutch device being an electrically controllable linearly-displaceable solenoid clutch having at least one electromagnetic coil and being configured such that when energized, the rotary drive element rotates the adjustment shaft and linearly displaces the adjustment spindle when the rotary drive element is driven by the brake application lever.

2. The lining wear adjustment device as claimed in claim 1, wherein the clutch device comprises:
  a clutch input side including at least one of a section of the rotary drive element and a section of a clutch element rotationally fixed to the rotary drive element;
  a clutch cover;
  the at least one electromagnetic coil; and
  a coil carrier for the electromagnetic coil.

3. The lining wear adjustment device as claimed in claim 2, wherein the rotary drive element is arranged in an axially displaceable manner at the input side of the clutch device and is rotatable about the longitudinal axis.

4. The lining wear adjustment device as claimed in claim 2, wherein the rotary drive element is coupled to an input side of the clutch device and is rotatable about the longitudinal axis, and is coupled in a rotationally fixed manner to an axially displaceable clutch element.

5. The lining wear adjustment device as claimed in claim 3, wherein the coil carrier is connected in a rotationally fixed manner to the rotary drive element.

6. The lining wear adjustment device as claimed in claim 4, wherein the coil carrier is connected in a rotationally fixed manner to the rotary drive element.

7. The lining wear adjustment device as claimed in claim 3, wherein the coil carrier is fixedly connected to the external bearing of the adjustment shaft.

8. The lining wear adjustment device as claimed in claim 4, wherein the coil carrier is fixedly connected to the external bearing of the adjustment shaft.

9. The lining wear adjustment device as claimed in claim 3, wherein
  the coil carrier has a disc section having a shell receptacle which is spherical in a central region, in which the spherical shell receptacle receives a spherical projection of a disc of the external bearing of the adjustment shaft and corresponds to the spherical projection of the disc of the external bearing.

10. The lining wear adjustment device as claimed in claim 4, wherein
  the coil carrier has a disc section having a shell receptacle which is spherical in a central region, in which the spherical shell receptacle receives a spherical projection of a disc of the external bearing of the adjustment shaft and corresponds to the spherical projection of the disc of the external bearing.

11. The lining wear adjustment device as claimed in claim 2, wherein
  the clutch cover surrounds the electromagnetic coil axially and at an end of the electromagnetic coil facing an adjustment spindle-engaging end of the adjustment shaft, and
  the clutch cover is connected in a rotationally fixed fashion to the adjustment shaft and has a clutch region which is rotationally fixed to the clutch input side when the electromagnetic coil is energized.

12. The lining wear adjustment device as claimed in claim 11, wherein the clutch section comprises friction linings.

13. The lining wear adjustment device as claimed in claim 11, wherein the clutch section comprises a toothed clutch.

14. The lining wear adjustment device as claimed in claim 13, wherein the toothed clutch has an oblique angle which is in the region of 20°.

15. The lining wear adjustment device as claimed in claim 1, wherein the clutch device comprises at least one release or resetting spring.

16. The lining wear adjustment device as claimed in claim 1, wherein the external bearing has a cardanic bearing of the adjustment shaft.

17. The lining wear adjustment device as claimed in claim 1, further comprising:
  a connection device connected in an electrically conductive manner to the at least one electromagnetic coil.

18. The lining wear adjustment device as claimed in claim 17, wherein the connection device has a plug-type connection via which the electromagnetic coil is connected electrically.

19. The lining wear adjustment device as claimed in claim 18, wherein the plug-type connection has conductors which are guided through the external bearing via an elastic securing device and are secured in said external bearing.

20. The lining wear adjustment device as claimed in claim 17, further comprising at least one lining wear sensor.

21. The lining wear adjustment device as claimed in claim 20, wherein the at least one lining wear sensor is at least partially a component of the connection device.

22. The lining wear adjustment device as claimed in claim 21, wherein the at least one lining wear sensor is an angle sensor, wherein a wear sensor element is arranged in the connection device and interacts with a wear encoder element which is connected to the adjustment shaft.

23. The lining wear adjustment device as claimed in claim 22, wherein the wear encoder element is a permanent magnet.

24. The lining wear adjustment device as claimed in claims 17, further comprising at least one actuating lever sensor.

25. The lining wear adjustment device as claimed in claim 24, wherein the at least one actuating lever sensor is at least partially a component of the connection device.

26. The lining wear adjustment device as claimed in claim 25, wherein
the at least one actuating lever sensor is an angle sensor, and
an adjusting sensor element is arranged in the connection device and interacts with an actuating encoder element which is coupled to the brake actuating lever.

27. The lining wear adjustment device as claimed in claim 26, wherein the actuating encoder element is a permanent magnet.

28. The lining wear adjustment device as claimed in claim 17, wherein the connection device has a control unit.

29. The lining wear adjustment device as claimed in claim 1, wherein the clutch device has at least one anti-rotation device.

30. The lining wear adjustment device as claimed in claim 1, wherein the lining wear adjustment device is configured to be inserted into an adjustment spindle of the disc brake for rotating the adjustment spindle to perform wear adjustment.

31. A method for controlling a lining wear adjustment device as claimed in claim 1, the method comprising the acts of:
detecting wear of brake linings of the disc brake;
adjusting for the wear of the brake linings upon reaching a preset comparison value, the adjustment being carried out by energizing the at least one electromagnetic coil of the clutch device during actuation of the disc brake via the brake actuating lever of the brake application device.

32. The method as claimed in claim 31, wherein the electromagnetic coil is energized as a function of a detected movement of the brake actuating lever.

33. The method as claimed in claim 32, wherein a friction point is determined via a frictional engagement of the adjustment spindle and a detection of the actuating movement of the brake actuating lever and the adjustment movement of the lining wear adjustment device.

34. The method as claimed in claim 31, wherein the lining wear adjustment device is reset by a presettable value by a return movement of the brake actuating lever by energizing the electromagnetic coil when the brake lining bears against a brake disc and grinds against the brake disc without application of the brake.

35. A disc brake, comprising:
a brake disc;
a caliper in which is arranged a brake application device having a brake actuating lever and at least one adjustment spindle actuable by the brake actuating lever; and
a lining wear adjustment device insertable into each of the at least one adjustment spindles, each lining wear adjustment device being configured to displace a respective one of the at least one adjustment spindles along an adjustment spindle longitudinal axis when the respective adjustment spindle is actuated by the brake actuating lever, comprising:
an adjustment shaft having an external bearing, the adjustment shaft being co-axially arranged with the respective adjustment spindle and configured to cooperate with the respective adjustment spindle to linearly displace the respective adjustment spindle along the longitudinal axis when the adjustment shaft rotates about the longitudinal axis,
a rotary drive element drivable by the brake application lever to rotate about the longitudinal axis; and
a clutch device operatively configured to controllably couple the rotary drive element to the adjustment shaft, the clutch device being an electrically controllable linearly-displaceable solenoid clutch having at least one electromagnetic coil and being configured such that when energized, the rotary drive element rotates the adjustment shaft and linearly displaces the respective adjustment spindle when the rotary drive element is driven by the brake application lever.

* * * * *